United States Patent
Ramakrishnan et al.

(10) Patent No.: US 11,773,700 B2
(45) Date of Patent: Oct. 3, 2023

(54) AUTONOMOUS OPTIMIZATION OF SINGLE-WELL AND MULTI-WELL GAS LIFT

(71) Applicant: Schlumberger Technology Corporation, Sugar Land, TX (US)

(72) Inventors: Terizhandur S. Ramakrishnan, Boxborough, MA (US); William J. Bailey, Somerville, MA (US); Kashif Rashid, Wayland, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 799 days.

(21) Appl. No.: 16/727,718

(22) Filed: Dec. 26, 2019

(65) Prior Publication Data

US 2021/0198988 A1    Jul. 1, 2021

(51) Int. Cl.
 *E21B 43/12* (2006.01)
 *G01F 1/78* (2006.01)
 *G01F 1/74* (2006.01)

(52) U.S. Cl.
 CPC .............. *E21B 43/122* (2013.01); *G01F 1/78* (2013.01); *G01F 1/74* (2013.01)

(58) Field of Classification Search
 CPC .... H02K 1/2746; H02K 1/276; H02K 1/2766; H02K 2213/03; H02K 29/03; H02K 7/006; H02K 1/278; E21B 2200/20; E21B 43/122; G01F 1/74; G01F 1/78
 See application file for complete search history.

(56) References Cited

U.S. PATENT DOCUMENTS

| | | | |
|---|---|---|---|
| 6,293,341 B1 * | 9/2001 | Lemetayer | E21B 43/122 166/250.15 |
| 6,454,002 B1 * | 9/2002 | Stokes | E21B 43/123 166/250.15 |
| 8,571,688 B2 * | 10/2013 | Coward | E21B 43/00 166/372 |

OTHER PUBLICATIONS

Rashid, "Optimal allocation procedure for gas-lift optimization", Ind. Eng. Chem. Res., vol. 49, pp. 2286-2294, 2010.

* cited by examiner

*Primary Examiner* — Harshad R Patel
*Assistant Examiner* — Gedeon M Kidanu
(74) *Attorney, Agent, or Firm* — Jeffrey D. Frantz

(57) ABSTRACT

Methods and systems are provided for controlling gas lift in at least one production well, which determine a quadratic function that relates flow rate or value of oil produced from a production well to gas flow rate for gas injected into the production well based on flow rate measurements for gas injected into the production well and corresponding flow rate measurements of oil produced from the production well. The quadratic function is used to determine an optimal flow rate for gas injected into the production well. The optimal flow rate for gas injected into the production well is used to control the flow rate of gas injected into the production well, and an oil flow rate produced from the production well is measured at the optimal gas flow rate for iterative processing to refine the quadratic function and determination of optimal gas flow rate if need be.

28 Claims, 12 Drawing Sheets

AUTONOMOUS OPTIMIZATION OF SINGLE-WELL AND MULTI-WELL GAS LIFT

BACKGROUND

1. Field

The present disclosure related to artificial lift of produced fluids in one or more wells that traverse a hydrocarbon-bearing formation, and, more particularly to control of gas lift in single-well and multi-well applications.

2. State of the Art

An oil field can utilize an artificial lift system to lift produced fluids in a well to the surface. One such artificial lift system is a gas lift system which employs a mandrel generally mounted along production tubing and lowered into the well's production casing together with the tubing. Gas is introduced into the annular region between the casing and the tubing under pressure, and valves positioned along and/or within the mandrel allow the gas to be introduced into the fluid flow within the production tubing. The gas lift system helps lift produced fluids to the surface by reducing the density of the produced fluid (and thus the downhole pressure), which accelerates the movement of the fluids up the production tubing.

Oil field operators can employ a control system to manage the operation of the gas lift system in order to optimize production of fluids at the surface. The paper by K. Rashid "Optimal Allocation Procedure for Gas-Lift Optimization," Ind. Eng. Chem. Res., 49, 2010, pp. 2286-2294, describes gas-lift optimization where lift performance is described in terms of a well-head pressure and the injected gas rate. The problem then needs to consider a network of pipelines and an offline/online sequence may be required.

Autonomous control and optimization of the gas lift system may be cumbersome. Consideration of well-head pressures and pipelines introduces complexities that are difficult and costly to implement for real-time automated applications.

SUMMARY

Methods and systems are provided for controlling gas lift in at least one production well, which involve:

i) determining a quadratic function that relates flow rate or value of oil produced from a production well to gas flow rate (which can be understood to be at specified standard conditions) for gas injected into the production well based on flow rate measurements for gas injected into the production well and corresponding flow rate measurements of oil produced from the production well;

ii) using the quadratic function to determine an optimal flow rate for gas injected into the production well; and iii) using the optimal flow rate for gas injected into the production well to control the flow rate of gas injected into the production well, and measuring an oil flow rate produced from the production well at the optimal gas flow rate for iterative processing to refine the quadratic function and determination of optimal gas flow rate if need be.

In embodiments, the operations of i) to iii) can be repeated, wherein for one or more iterations of i) to iii), the quadratic function of i) is based on the measurement of oil flow rate in the previous iteration of iii).

In embodiments, the measurement of oil flow rate in the previous iteration of iii) replaces a data point used to determine the quadratic function in the previous iteration of iii) and preserves non-monotonicity of the quadratic function.

In embodiments, the operations of i) to iii) can be repeated for one or more iterations until a predetermined criterion is satisfied. In embodiments, a shift in oil rate at the previously set optimal gas injection rate is taken into account while preserving nonmonotonicity to update the quadratic function and obtain a new optimal gas injection rate.

In embodiments, the quadratic function relates oil flow rate produced from the production well to injected gas flow rate for gas injected into the production well. In other embodiments, the quadratic function relates oil flow rate produced from the production well to shifted gas flow rate for gas injected into the production well, wherein shifted gas flow rate is based on injected gas flow rate less a threshold gas flow rate.

In embodiments, the optimal flow rate for gas injected into the production well as determined in ii) can be based on coefficients of the quadratic function. For example, the optimal flow rate can be calculated as $-B_1/2A_1$.

In embodiments, for multi-well applications, the operations of i) can be performed separately for a plurality of production wells to determine a corresponding plurality of quadratic functions, wherein each quadratic function relates oil flow rate produced from one of the plurality of production wells to gas flow rate for gas injected into that one production well. Operations of ii) can use the plurality of quadratic functions to determine optimal flow rates for gas injected into each one of the plurality of production wells. The operations of iii) can use the plurality of optimal flow rates for gas injected into plurality of the production wells to control the flow rate of gas injected into the plurality of production wells, and measure oil flow rates produced from the plurality of production wells at the optimal flow rates of gas injected into the plurality of production wells.

In embodiments, the optimal flow rate for gas injected into at least one of the plurality of production wells as determined in ii) can be based on coefficients of the quadratic function for the corresponding production well. For example, the optimal flow rate can be calculated as $-B_1/2A_1$.

In embodiments, the optimal flow rate for gas injected into at least one of the plurality of production wells as determined in ii) can be based on a constraint. For example, the constraint can be based on a total available flow rate $Q_g$ of injected gas from a common gas source shared by the plurality of production wells. Alternatively or additionally, the constraint can be based on a threshold rate of injected gas for at least one production well.

In embodiments, the optimal flow rates for gas injected into the plurality of production wells as determined in ii) can be based on a system of nonlinear equations solved by a sequential quadratic programming (SQP) solver. In these embodiments, the optimal flow rates for gas injected into the plurality of production wells can be formulated as a nonlinear optimization problem that can be solved by a sequential quadratic programming (SQP) solver.

Systems for controlling gas lift in at least one production well are also described and claimed, which include a first flow meter for measuring flow rate of gas injected into a production well, a control valve for controlling flow rate of gas injected into the production well, and a second flow meter for measuring flow rate of oil produced from the production well. A controller is operably coupled to the first flow meter, the control valve, and the second flow meter. The controller can be configured to perform the operations of i) to iii) to control gas lift in an optimal manner as described and claimed.

DETAILED DESCRIPTION OF THE PREFERRED EMBODIMENTS

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Figure 1:
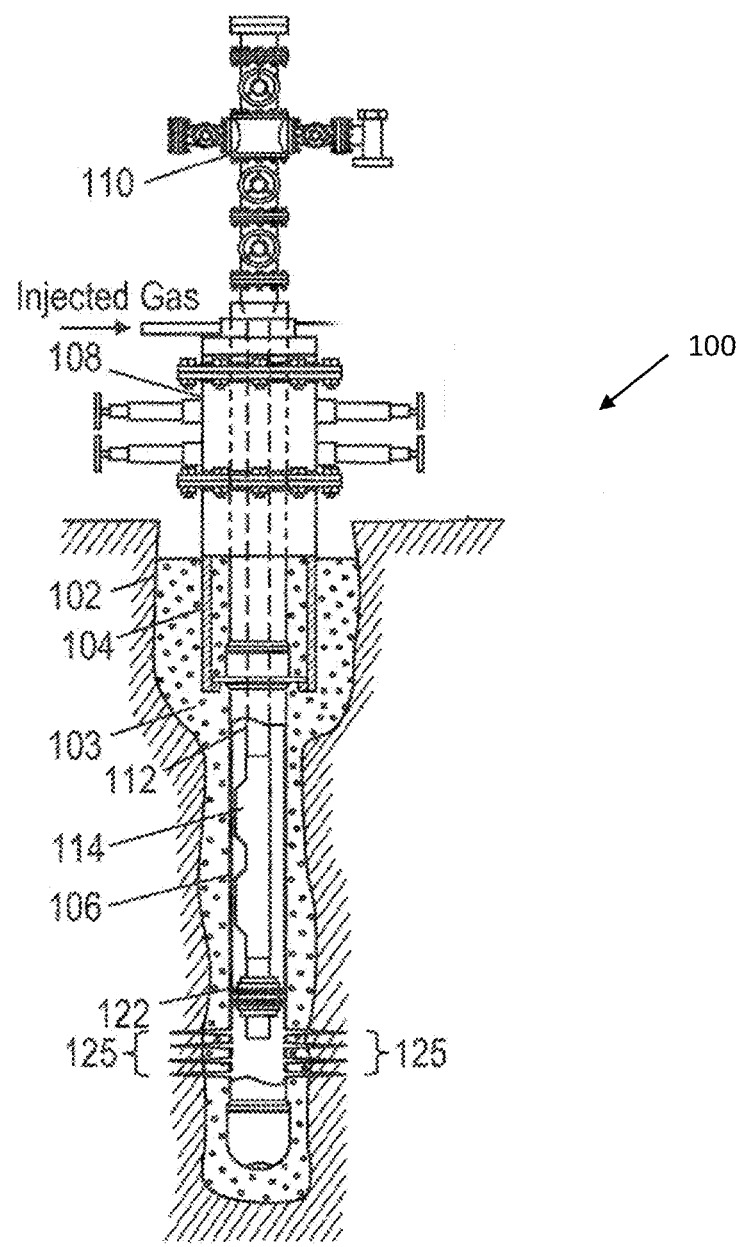
FIGS. 1 and 2 are schematic diagrams of a single exemplary production well that employs a gas lift system for artificial lift.

The systems and methods described herein operate to control operations of a gas lift system that lifts produced fluids from one or more wells, such as those found in oil and gas fields. Such fields generally include one or more production wells that provide access to the reservoir fluids underground. FIG. 1 shows an example production well 100 with a borehole 102 that has been drilled into the earth. Such boreholes can be drilled to ten thousand feet or more in depth and can be steered horizontally for perhaps twice that distance. The production well 100 also includes a casing header 104 and casing 106, both secured into place by cement 103. Blowout preventer (BOP) 108 couples to casing header 104 and the wellhead 110, which together seal in the wellhead and enable fluids to be extracted from the well in a safe and controlled manner.

A packer 122 and a gas lift mandrel (or tool) 114 are coupled in-line with production tubing 112 that extends to the wellhead 110. The packer 122 is configured to isolate the production zone 125 of the reservoir below the packer 122 from the upper part of the well. Produced fluids flow from the production zone 125 into the flowline of the production tubing 112. Pressurized gas is injected from the surface into the annular region between the casing 106 and the production tubing 112 and gas lift mandrel 114. The gas lift mandrel 114 has valves that are configured to permit injection of the gas from the annular region between the casing 106 and the mandrel 114 into the flowline of the mandrel 114 and the production tubing 112. In this manner, the gas is introduced into the fluid flow within the production tubing 112 and helps lift produced fluids to the surface by reducing the density of the produced fluid, which accelerates the movement of the fluids up the production tubing 112.

Figure 2:
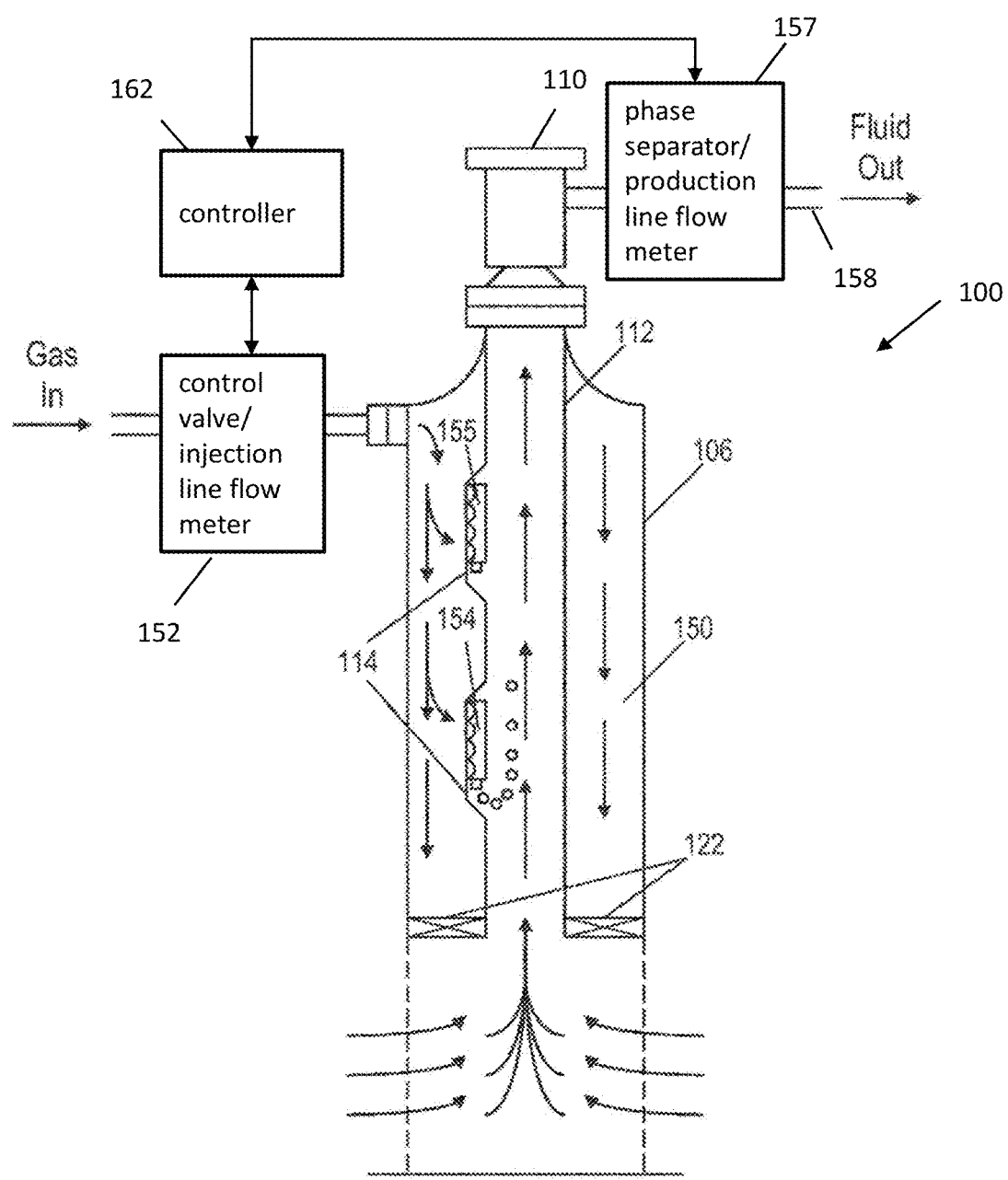

FIG. 2 shows a diagram of an illustrative gas lift system incorporated into the production well of FIG. 1, and includes some components not shown in FIG. 1 while excluding others for clarity. Pressurized gas is supplied by a gas source (not shown) and injected into the annular region 150 between the casing 106 and mandrel 114 under pressure via a control valve (or choke) and injection line flow meter 152 located at the surface The control valve of block 152 can be operated under control of a surface-located controller 162 to regulate the gas injection pressure or the flow rate of the gas that is injected into the well 100 during operation of the well. The injection line flow meter of block 152 can be configured to measure the flow rate of the gas that is injected into the well 100 during operation of the well and communicate data or signals representative of such flow rate measurements to the controller 162. The communication interface(s) between the controller 162 and the valve and injection line flow meter of block 152 can be a wired electrical communication link, a wireless communication link, an optical communication link or other suitable communication system. The injection line flow meter can be disposed upstream or downstream from the control valve. The gas lift mandrel 114 includes valves 154, 155 that allow the pressurized gas to flow from the annular region 150 into the flowline of the mandrel 114 and the production tubing 112, while preventing produced fluid (e.g., oil) within the flowline of the mandrel 114 and the production tubing 112 from flowing back out into annular region 150. The injected gas can mix with the produced fluid (e.g., oil) in the flowline and reduce the density of the produced fluid. In this manner, the injected gas can help lift produced fluids to the surface and accelerate the movement of the produced fluids up the production tubing 112. At the surface, the produced fluids pass through the wellhead 110 to a phase separator and production line flow meter 157 for output to a production line 158. The phase separator of block 157 can be configured to separate components (such as oil, water and possibly gas) of the flow of produced fluid that exits the wellhead 110. The oil component flow produced by the phase separator flows to the production line 158. The production line flow meter of block 157 is disposed downstream of the phase separator and is configured to measure the flow rate of the oil that flows from the phase separator into and through the production line 158 during operation of the well. The production line flow meter can communicate data or signals representative of such flow rate measurements to the controller 162. The communication interface between the controller 162 and the production line flow meter can be a wired electrical communication link, a wireless communication link, an optical communication link or other suitable communication system. The produced gas may be collected, compressed, and reinjected.

Figure 3:
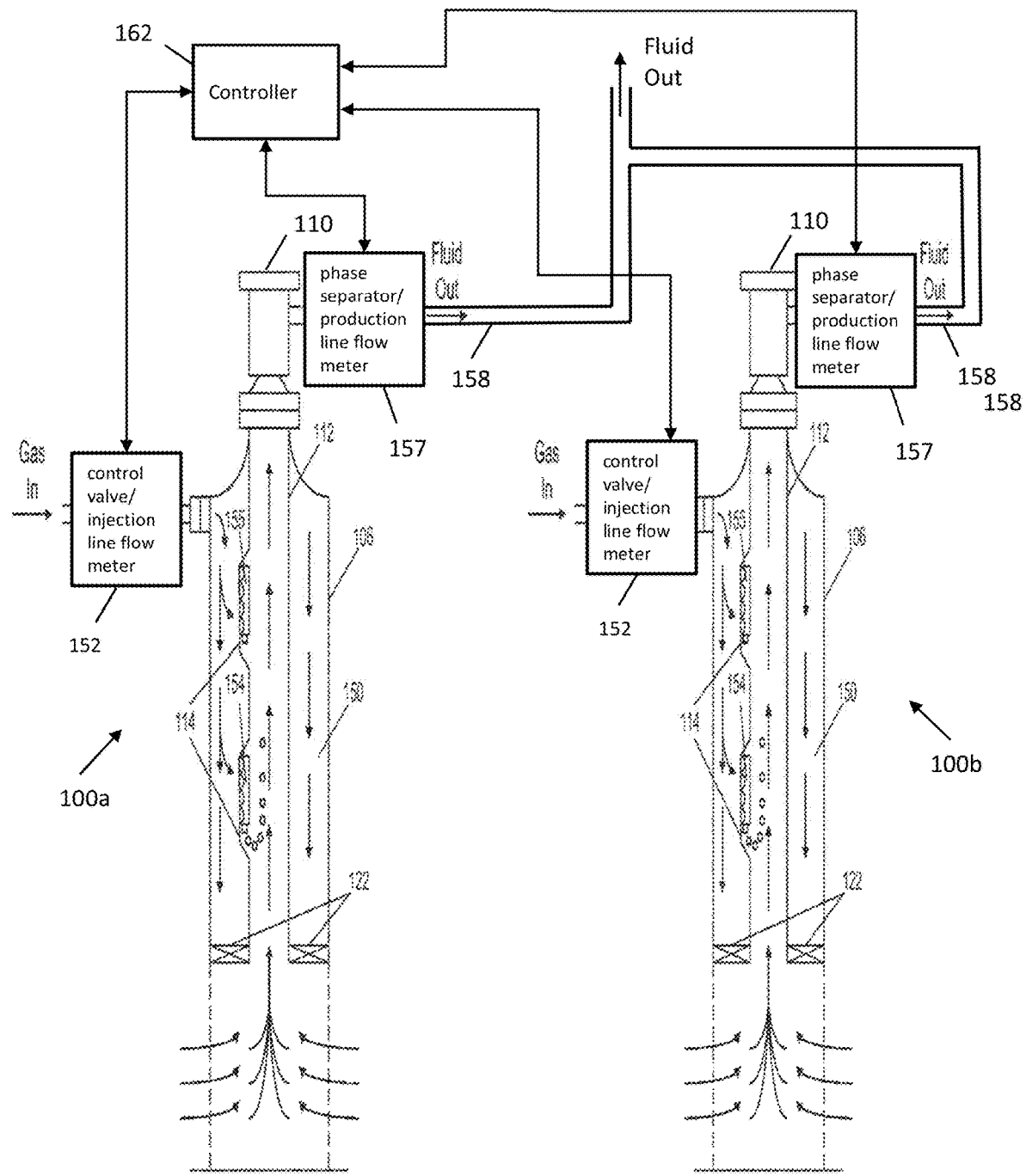
FIG. 3 is a schematic diagram of two exemplary production wells that employ a gas lift system for artificial lift.

FIG. 3 shows a diagram of an illustrative gas lift system incorporated into two production wells 100a, 100b, which are similar to the production well 100 of FIGS. 1 and 2. The gas lift system includes many components (including control valve and injection flow meter of block 152, gas lift mandrel 114, and phase separator and production line flowmeter of block 157) that are replicated for each one of the wells 100a, 100b and operate under control of a common controller 162. Note that the produced oil that flows through the production lines 158 of the two wells 100a, 100b can be combined for output to a pipeline as shown. Furthermore, the pressurized gas that is supplied to the control valves of block 152 of the two wells 100a, 100b can be provided by a common gas source (not shown). In this case, because the pressurized gas used for the gas lift is shared between multiple wells, the maximum gas flow into the wells can be constrained by the maximum output of the common gas source. Such constraints can be limiting when a number of wells share the output of a common gas source.

Gas-Lift Principles

When a production well is unable to lift produced fluid (liquid hydrocarbon) over the entire vertical height of the well (H), the reservoir pressure is lower than the wellhead pressure (Po) plus the pressure due to the column height. Artificial lift is required if $$P_0 + \int_{-H}^{0} \rho_0 g dz > P_f, \quad \text{Eqn. (1)}$$

where $P_f$ is the formation pressure, z is the vertical height referenced to the wellhead, $\rho_o$ is the density of the produced fluid (liquid hydrocarbon), and g is the acceleration due to gravity. Note that the integration is with respect to a vertical coordinate z.

Alternatively, an equilibrium height ($H_e$) may be obtained by solving $$P_0 + \int_{-H_e}^{0} \rho_0 g dz = P_f, \quad \text{Eqn. (2)}$$

for $H_e$. Obviously given that $\rho_o>0$, $H_e<H$ when artificial lift is necessary. In general, $\rho_o$ varies with pressure p and temperature T, but in comparison to gas density, $\rho_g$, this may be a minor variation.

The principle in gas lift is to inject gas at a particular flow rate ($q_g$), preferably optimally, in order to achieve as high an oil production flow rate ($q_o$) as possible by reducing the fluid mixture density of the produced fluid and gas lower than $q_o$ so that $H_e>H$. In embodiments, the flow rate $q_g$ for a particular well can be determined from flow rate measurement(s) of a surface-located gas injection line flowmeter (e.g., block 152 of FIGS. 2 and 3), reported at standard conditions. Such standard conditions as per IUPAC, refer to a temperature and pressure of 0° C. and 100 kPa respectively. The oil production flow rate ($q_o$) can be determined from the flow rate measurement(s) of one or more a surface-located production line flowmeters (e.g., block 157 of FIGS. 2 and 3). Note that a low gas injection flow rate does not reduce the produced fluid density sufficiently to achieve the optimal rate, and too high a gas injection rate reduces the liquid fraction in the produced fluid so much that the produced oil flow rate suffers. More importantly, since $H_e<H$, $q_g$ has to be above a threshold flow rate ($\theta_g$) for the oil production flow rate $q_o>0$. At a given reservoir state, there then exists an optimal flow rate of injected gas (denoted $q_{g,O}$) which can be specified as $$\frac{dq_0(q_{g,O})}{dq_g} = 0, \quad \text{Eqn. (3)}$$

at the current reservoir condition. This optimal flow rate $q_{g,O}$ is greater than $\theta_g$, and is always positive. A constraint on the total available flow rate of injected gas can be given and denoted $Q_g$. For a single well, this constraint is not an issue. However, in multi-well applications, this constraint can be of issue and accounted for as described below.

Usually, the reservoir time scales are much larger than the wellbore equilibration time, and for the purpose of this disclosure, the reservoir can be deemed to be pseudo-static. This separation of time scales allows the control schemes as described herein to construct a formal solution to the gas-lift optimization problem. In these solutions, no well is affected by an adjusted production in other wells over a time-scale of stabilization within the well.

Advantageously, the control schemes disclosed herein do not consider well-head pressures. Specifically, by configuring a surface-located control valve to set the flow rate of injected gas at the wellhead, the flow rate of the oil component of the produced fluid at the surface can be considered to be a function of the flow rate of the injected gas. In embodiments, the flow rate of the oil component of the produced fluid at the surface can be considered to be a function of the flow rate of the injected gas at standard conditions. Thus, considerations of pipelines are not needed. Furthermore, the control schemes do not require detailed modeling of either the wellbore or the reservoir, and relies on measurements of flow rates at the surface and some basic principles of the gas-lift mechanism. Since the control schemes do not rely upon detailed simulations, the control schemes can be easily implemented for real-time automated applications. Furthermore, the control schemes can determine optimal set points for controlling gas injection in multiple wells independently from one another with due inclusion of limitations imposed by constraints.

Single Well Optimization

Before constructing a general algorithmic solution, it is useful to illustrate an observation-based autonomous control scheme through a single-well example. For many reasons that will become obvious below, it is convenient to represent the stabilized oil flow rate at the surface with respect to the flow rate of injected gas as a quadratic function where the coefficients of the quadratic function vary with time albeit slowly in comparison to the optimization and stabilization time. The relation of the stabilized oil flow rate with respect to the flow rate of injected gas may be represented by a higher order polynomial function, but a quadratic function is the order necessary and sufficient to obtain a unique optimal flow rate from Eqn. 3. A quadratic function also affords simple algebraic expressions for fast computations for autonomous control systems. Furthermore, the quadratic function can be localized or solved from most recent measurements, which allows the quadratic function to be pseudo-static and it is also expected to be accurate near the operating point.

It is to be understood that the principles discussed here may be generalized to higher order functions of expressing $q_o$ with respect to $q_g$, by adding more stabilized rates to fit a polynomial, or a min-max polynomial, or a best-fit polynomial function. But a higher order polynomial function is undesirable for many reasons: (i) a number of $(q_g, q_o)$ data pairs need to be obtained; (ii) with increasing number of data pairs, the product of number of pairs to wellbore stabilization time may approach a non-negligible fraction of interference time between wells; and (iii) expressions become needlessly complex with the possibility of multiple extrema.

Note that a quadratic function has the benefit that only three data points are needed at any stage of a decision step. Thus, for one well, with integer $i \in 1,3$ representing the three data points, the data points for the optimal flow rate $q_{g,O}$ can be given as $$q_{o1i} = A_1 q_{g1i}^2 + B_1 q_{g1i} + C_1,\qquad\text{Eqn. (4)}$$

where it is assumed that the $A_1$, $B_1$, and $C_1$ are updated when a new point is added to the flow rates and an old one dropped. The subscript 1 for $A_1$, $B_1$, and $C_1$ is an index that refers to the well, and these values are derived from the most recent data. With regard to the notation used in Eqn. (4), the first subscript o for the flow rate $q_o$ denotes the oil phase, the second subscript 1 for the flow rate $q_o$ represents the well, and the third subscript i for the flow rate $q_o$ denotes the data point. Similarly, the first subscript g for the flow rate $q_g$ denotes the gas phase, the second subscript 1 for the flow rate $q_g$ represents the well, and the third subscript i for the flow rate $q_g$ denotes the data point. For instances where the third subscript is absent implies only the well, and instances where both the second and third subscripts are absent refers to the phase in a general context.

Given three data points for the flow rates, the coefficients are $$A_1 = \frac{1}{q_{g12}-q_{g13}}\left[\frac{q_{o11}-q_{o12}}{q_{g11}-q_{g12}}-\frac{q_{o11}-q_{o13}}{q_{g11}-q_{g13}}\right],\qquad\text{Eqn. (5)}$$

$$B_1 = \frac{q_{o11}-q_{o12}}{q_{g11}-q_{g12}} - \frac{q_{g11}+q_{g12}[q_{g11}(q_{o13}-q_{o12})+q_{g13}(q_{o12}-q_{o11})+q_{g12}(q_{o11}-q_{o13})]}{(q_{g12}-q_{g13})(q_{g11}-q_{g12})(q_{g11}-q_{g13})},\qquad\text{Eqn. (6)}$$

and $$C_1 = q_{o11} - A_1 q_{g11}^2 - B_1 q_{g11}.\qquad\text{Eqn. (7)}$$

Knowing $A_1$ and $B_1$ from the three settings of $q_g$ is now enough to set the optimal rate of $q_g$ (for $A_1 \neq 0$) as $$q_{g1,O} = -\frac{B_1}{2A_1}.\qquad\text{Eqn. (8)}$$

Eqn. (5) shows that $A_1 < 0$, thereby assuring upward convexity, if the three points are non-monotonic for $q_o$ with increasing $q_g$. If $A_1$ and $B_1$ are both zero, or close to it, for the ratio to be meaningful, the flow rate $q_{o1}$ is a constant, and $q_{g1}$ does not affect $q_{o1}$ suggesting that all of the three rates are acceptable and are close to optimal. To reemphasize, in the absence of measurement errors, $q_o$ is a convex-upward function, and therefore $A_1 < 0$.

If $q_{g1,O}$ is substantially different from the first three rates, an option to limit the next setting may be imposed so that $q_{g1,O}$ does not change from $\min(q_{g1})$ or $\max(q_{g1})$ by a preset threshold value. Now, upon setting $q_{g1,O}$, or a change-limited version of it, a new data point is obtained. Data point i=1 (the earliest) may be dropped, and the others moved down in index with $q_{g1,O}$ becoming $q_{g13}$. Another option is to search the three points and discard the point that still preserves non-monotonicity in $q_o$ vs. $q_g$. This approach keeps the new $q_{g1,O}$ within bounds. The process may then be continued, until an acceptable convergence to $q_{g1,O}$ is found. Once thus determined, the flow rate $q_{g1}$ needs to be periodically set to a different value away from the current $q_{g1,O}$ (possibly one of $q_{g11}$ and $q_{g12}$) for updating the parameters for $A_1$, $B_1$, and $C_1$ of the quadratic equation and the solution for the new $q_{g1,O}$. The timescale for such periodic update to the new flow rate $q_{g1}$ can be selected to be greater than the characteristic interwell interference time for the field in order to allow the system to equilibrate. Note that if $q_{g1,O} > Q_g$, the flow rate $q_{g1,O}$ can be limited to $Q_g$. In this case, the oil production rate is limited by gas supply. Note that the optimal gas injection rate(s) as determined from the methodology described herein need not be the most optimal injection rate(s) but can provide a solution that is close to the most optimal injection rate within an acceptable tolerance range.

The description above demonstrates how single-well gas lift optimization may be carried out purely by observation. No reservoir knowledge other than to know the separation of well-bore time scale from that of the interwell interference time is necessary.

Two-Well System

A similar control scheme can be applied for simultaneous gas-lift optimization of two wells. Because the time scales of interference are much larger than the time scale of well response to gas injection, the two-dimensional optimization problem can be disentangled into two one-dimensional optimizations subject to imposed constraints. Common pipelines for the handling of oil can be assumed to be large enough that there is no limit on the produced oil flow rate. Because the control scheme for gas rate optimization is based on flow control, it is reasonable to assume that any common pressure link to gas lines is inconsequential. For example, an extra drawdown in one gas line will reduce the gas supply pressure, but the second line's control valve should open correspondingly to maintain the requisite gas injection flow rate.

It is evident that as long as there are no bounds imposed on the total flow rate of oil $Q_o$ from the two wells and no bounds imposed on the total flow rate of injected gas into the two wells given as $Q_g$, the control of the gas injection flow rates $q_{g1,O}$ and $q_{g2,O}$ should yield the maximum $q_o$ as long as $q_{g1,O} \geq \theta_{g1}$ and $q_{g1,O} \geq \theta_{g2}$, where $\theta_{g1}$ or $\theta_{g2}$ are threshold gas injection flow rates for the two wells. If not, the injection gas flow rate $q_{g1}$ or $q_{g2}$ can be set to the corresponding threshold flow rate $\theta_{g1}$ or $\theta_{g2}$ whenever the inequality is not satisfied, thereby accepting a lower $q_o$ than indicated without constraints (for example, a negative $q_{g1}$ or $q_{g2}$ is not possible).

The control scheme gets more complicated if a limit is set on $Q_g$. In this case, it is assumed that $$Q_g > \theta_{g1} + \theta_{g2}.\qquad\text{Eqn. (9)}$$

If $Q_g$ is greater than $[\max(q_{g1,O}, \theta_{g1}) + \max(q_{g2,O}, \theta_{g2})]$, the optimal points are not constrained, and the wells can operate independently just as in a single well. Suppose $Q_g$ is less than $[\max(q_{g1,O}, \theta_{g1}) + \max(q_{g2,O}, \theta_{g2})]$ as determined by the independent well assumption. Ignoring the threshold requirement for the moment, with the bound $Q_g$ specified, the optimum operation is one such that $q_{g1} + q_{g2} = Q_g$, but $Q_o = q_{o1} + q_{o2}$ is maximized. In such cases, the control scheme can first determine $A_1$, $A_2$, $B_1$, $B_2$, $C_1$ and $C_2$, either by operating one well at a time, or choosing injection gas flow rates for the two wells such that their sum$\leq Q_g$.

Optimizing $q_o$ with respect to one of the injection gas flow rates subject to $q_{g1} + q_{g2} = Q_g$ gives the optimal rate $$q_{g1,O} = -\frac{-(B_1 - B_2) + 2A_2 Q_g}{2(A_1 + A_2)}, \qquad \text{Eqn. (10)}$$

and, by symmetry, $$q_{g2,O} = -\frac{-(B_2 - B_1) + 2A_1 Q_g}{2(A_1 + A_2)}. \qquad \text{Eqn. (11)}$$

When thresholds are not violated, the gas injection flow rates for the two wells can be set to these values $q_{g1,O}$, $q_{g2,O}$. And the resulting oil production flow rates can be measured and the parameters $A_1$, $A_2$, $B_1$, $B_2$ for the two quadratic functions may be updated. In subsequent steps, $q_{g1}$ and $q_{g2}$ can be calculated as though there is no bound, and subsequently check whether the sum $q_{g1} + q_{g2}$ exceeds $Q_g$. If so, the optimal gas injection flow rates $q_{g1,O}$ and $q_{g2,O}$ can be calculated according to Eqns. (10) and (11), respectively, but with the updated quadratic functions for $q_g \mapsto \hat{q}_o(q_g)$, where ^ denotes the quadratic function.

When the thresholds are violated by Eqns. (10) or (11), the flow rate of injected gas for that well can be set to the corresponding threshold rate ($\theta_{g1}$ or $\theta_{g2}$). Without loss of generality, say $q_{g2,O} < \theta_{g2}$, the operating condition for the second well can be set to $$q_{g2,O} = \max\left(-\frac{-(B_2 - B_1) + 2A_1 Q_g}{2(A_1 + A_2)}, \theta_{g2}\right), \qquad \text{Eqn. (12)}$$

and $$q_{g1,O} = \min\left(Q_q - q_{g2,O}, -\frac{B_1}{2A_1}\right). \qquad \text{Eqn. (13)}$$

Thus, when both the threshold and limit on total injection gas flow rate are imposed, given $\hat{q}_o(q_g)$ for the two wells, Eqns. (10) and (11) can be used to compute and set the two gas injection flow rates if $q_{g1,O} + q_{g2,O}$ is less than $Q_g$. Otherwise, when $q_{g1,O} + q_{g2,O}$ exceeds $Q_g$, and if one of them from Eqns. (10) and (11) violates the bound of the threshold $\theta_{gi}$ (both cannot violate since the sum of the thresholds$<Q_g$), then the gas injection flow rate for that well can be set to the corresponding threshold $\theta_{g1}$ or $\theta_{g2}$, and the gas injection flow rate for the other well can be calculated and set according to Eqn. (13) where the index for the one well set to the threshold rate is indicated as well 2 in Eqn. (13). Upon stabilization, the quadratic functions for the two wells can be updated and the process can be repeated.

Multiple Wells

For applications involving gas lift of multiple wells, a notation is employed where a single subscript index i for the flow rates and quadratic coefficients A, B and C refers to well i. As described in the two-well problem, from three different settings of flow rates $q_g$ for a given well i, the flow rate of produced oil can be given as $$q_{oi} = A_i q_{gi}^2 + B_i q_{gi} + C_i. \qquad \text{Eqn. (14)}$$

Note that $A_i < 0$. Optimizing the wells, without any restraint on the amount of available gas, gives $$q_{gi,O} = \max\left(-\frac{B_i}{2A_i}, \theta_{gi}\right). \qquad \text{Eqn. (15)}$$

Obviously, the thresholds $\theta_{gi}$ can be set so that at $\theta_{gi}$, $q_{gi} \geq 0$ (usually $q_{oi} = 0$). After the thresholds are met, it is possible for $\Sigma_i q_{gi,O} > Q_g$. If not, all of the gas injection flow rates can be set to $q_{gi,O}$ and the process continues. If the constraint in $Q_g$ is violated, $q_{g1}$ and $q_{g2}$ can be set such that the sum of $q_{g1}$ and $q_{g2}$ is equal to $Q_g$. Now, with the equality constraint, writing to minimize subtraction errors, it is preferable (and by no means necessary) to choose the gas injection flow rate $q_{gN}$ for the last well N to be the largest expected one as follows $$q_{qN} = Q_g - \sum_{i=1}^{N} q_{gi}. \qquad \text{Eqn. (16)}$$

This allows for calculation of the total flow rate of oil production as follows $$Q_o = \left(\sum_{j=1}^{N-1} \left(A_j q_{gj}^2 + B_j q_{gj} + C_j\right)\right) + q_{oN}. \qquad \text{Eqn. (17)}$$

For the moment, the thresholds can be ignored but with a requirement that the sum of gas injection flow rates does not exceed $Q_g$. If the wells are numbered from 1 to N where $N > 2$, the gas injection flow rate of well N in Eqn. (17) can be replaced as follows $$Q_o = \left(\sum_{j=1}^{N-1} \left(A_j q_{gj}^2 + B_j q_{gj} + C_j\right)\right) + \left(A_N q_{gN}^2 + B_N q_{gN} + C_N\right). \qquad \text{Eqn. (18)}$$

Maximizing $Q_o$ with respect to $q_{gi}$ yields N−1 relationships as follows $$2A_i q_{gi,O} + B_i - 2A_N \left(Q_g - \sum_{j=1}^{N-1} q_{gi,O}\right) - B_N = 0 \qquad \text{Eqn. (19)}$$

for $i = 1, 2, \ldots, N - 1$.

The linear system of equations of (19) provides solutions for $q_{gi,O}$ for i arranging from 1 to N−1. And from Eqn. (16), the optimal $q_{gN}$ for the last well N is also known. In matrix form, Eqn. (19) may be represented as $$Vu = w, \qquad \text{Eqn. (20)}$$

where the elements of V are $$v_{ij} = 2A_i \delta_{ij} + 2A_N, \qquad \text{Eqn. (21)}$$

where $\delta_{ij}$ is the Kroneckar delta, and
where the elements of u are $$u_i = q_{gi,O}, \text{and} \qquad \text{Eqn. (22a)}$$

where the elements of w are $$w_i = B_N - B_i + 2A_N Q_g. \qquad \text{Eqn. (22b)}$$

The $q_{gi,O}$ of Eqn. (22a) can be obtained by solving the linear system of equations of (20). Naturally, the sum of all the flow rates $q_{gi,O}$ would be $Q_g$. A check is however necessary for any violation of the threshold constraint imposed by $\theta_{gi}$. For example, if M of the flow rates $q_{gi,O}$ violate this constraint, it is quite possible that the previously indexed Nth flow rate could be one of the M. If it does not satisfy the lower bound $\theta_{gN}$ constraint, the indices for the violating wells run from (N−M+1) to N. In this case, the flow rates $q_{gi}$ for the violating wells (N−M+1) to N can be set to $\theta_{gi}$. If the $N^{th}$ well satisfies the constraint, then the index for this well is shifted to (N−M) and again set the flow rates for the violating wells (N−M+1) to N to $\theta_{gi}$. The previous $Q_g$ can be used to define the flow rate $Q_{g0}$ and $Q_g$ can be updated to be $$Q_g = Q_{g0} - \sum_{i=N-M+1}^{N} \theta_{gi}. \qquad \text{Eqn. (23)}$$

Now the optimization is reduced to N−M wells, but satisfying the constraint that the total gas injection rate must be at most $Q_{g0}$. Since all of the wells greater than an index of N−M have had their flow rates increased from optimum setting in order to meet the threshold. the old optimal positions for wells indexed from 1 to N−M will result in a total rate exceeding $Q_{g0}$. Therefore, it is necessary that the equality constraint for wells indexed from 1 to N−M be satisfied. Thus, we may again eliminate well with index N−M because $$Q_g = \sum_{i=1}^{N-M} q_{gi}, \qquad \text{Eqn. (24)}$$

where $Q_g$ satisfies Eqn. (23).
Eqn. (19) can be rewritten as $$2A_i q_{gi,O} + B_i - 2A_{N-M}\left(Q_g - \sum_{j=1}^{N-M-1} q_{gj,O}\right) - B_{N-M} = 0 \qquad \text{Eqn. (25)}$$

for $i = 1, 2, \ldots, N - M - 1$.

Note that Eqns. (21), (22(a)) and (22(b)) are still applicable along with Eqn. (20) for solving for the N−M−1 unknowns for the flow rates $q_{gi}$ with the $(N-M)^{th}$ $q_{gi}$ obtained from Eqn. (24) and $A_{N-M}$ and $B_{N-M}$ replacing $A_N$ and $B_N$. A check is again made to see whether any of the $\theta_{gi}$ is violated by the N−M values for $q_{gi}$. For any of the violated $q_{gi}$, the gas injection flow rate can be set to the corresponding threshold $\theta_{gi}$ and the process can be repeated until all the optimum values meet the constraint as well.

With all of the flow rates set for $q_{gi}$, new values of $q_{oi}$ can be measured and the quadratic functions for the wells updated. As part of updating the quadratic functions, one of the three datapoints that define the quadratic function for a given well can be dropped and replaced by the new data point given by the $q_{gi}$ value and the measured $q_{oi}$ value. Preferably, the datapoint that is dropped is the oldest datapoint that still preserves non-monotonicity of the $q_o$ vs. $q_g$ relation. New values for the $A_i$, $B_i$ and $C_i$ coefficients of the quadratic functions for the wells can also be calculated. The process may be continued ad infinitum so that all wells operate as optimally as possible over time.

Note that the multi-well control scheme does not require reservoir characterization and model building. The process may be automated.

Single Well Example

Figure 4A:
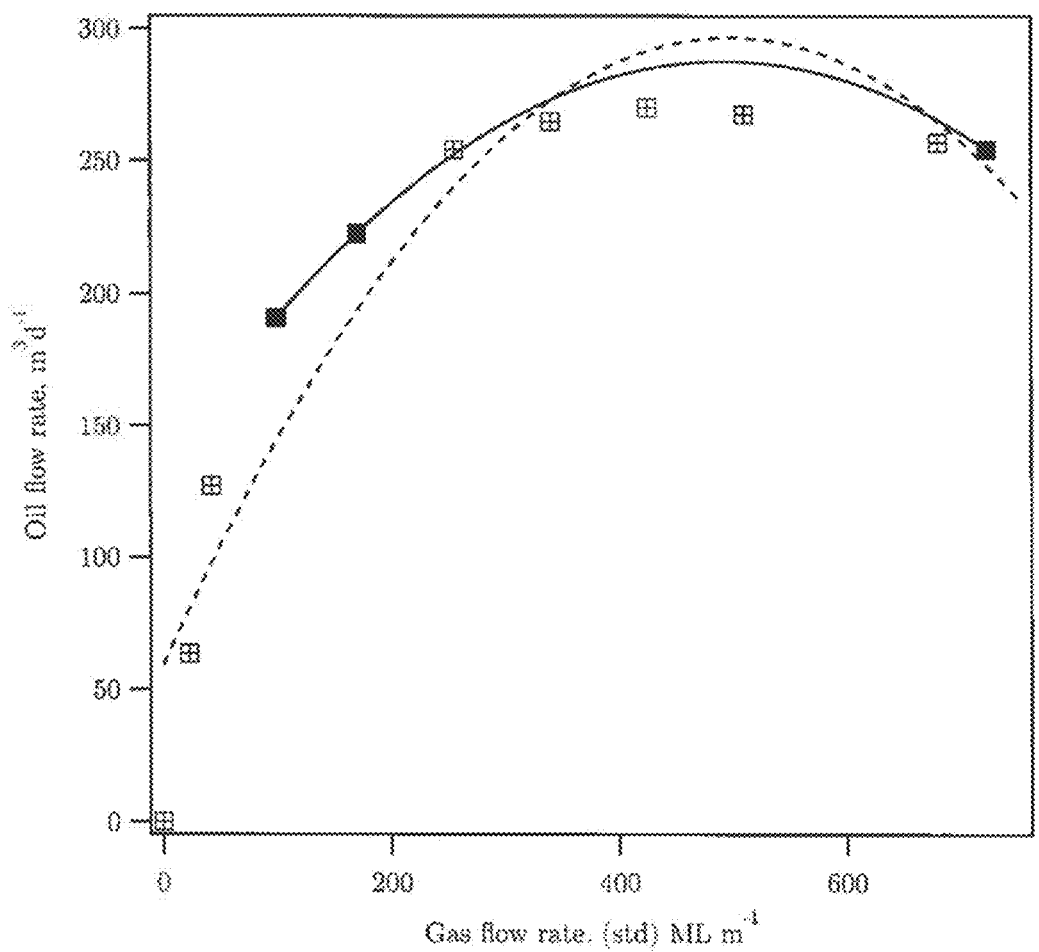
FIG. 4A is a plot of the flow rate of produced oil as a function of gas injection flow rate for a single exemplary production well employing the gas lift system of FIG. 2. The plot shows two curves, both of which are quadratic in form. The dashed quadratic is based on field data shown with markers and represents a standard least squares fit with equal weights for all of the data points. The solid quadratic is determined using the control scheme as described in the present disclosure.

The control scheme can be illustrated with an example using a single well. This example assumes that there is no constraint on $Q_g$ for the single well. Based on representative field data, an example oil production flow rates vs. gas injection flow rates is shown in in FIG. 4A. The plot shows two curves, both of which are quadratic. The dashed quadratic uses all of the data shown with markers and represents a standard least squares fit with equal weights for all of the points. The solid curve uses three data points represented by filled markers, and in this case are at approximately $q_{g1}=\{99.11, 169.9, 722.1\}$ ML d$^{-1}$. The quadratic curve with oil rate (in m$^3$ d$^{-1}$) is of the form $$q_{o1} = -0.0006286 q_{g1}^2 + 0.6183 q_{g1} + 135.7. \qquad \text{Eqn. (26)}$$

Eqn. (8) would set $$q_{g1,O} = 491.8 \text{ ML d}^{-1}. \qquad \text{Eqn. (27)}$$

Assuming that the separation of time scales discussed earlier still holds, the new oil rate that would be obtained is 268.2 m$^3$ d$^{-1}$. Dropping the first point at a $q_g$ of 99.11 ML d$^{-1}$, the new (rounded) gas rates used for the quadratic would be $q_{g1}=\{491.8, 169.9, 722.1\}$MLd$^{-1}$ with $$q_{o1} = -0.0003653 q_{g1}^2 + 0.2835 q_{g1} + 168.0. \qquad \text{Eqn. (28)}$$

Figure 7:
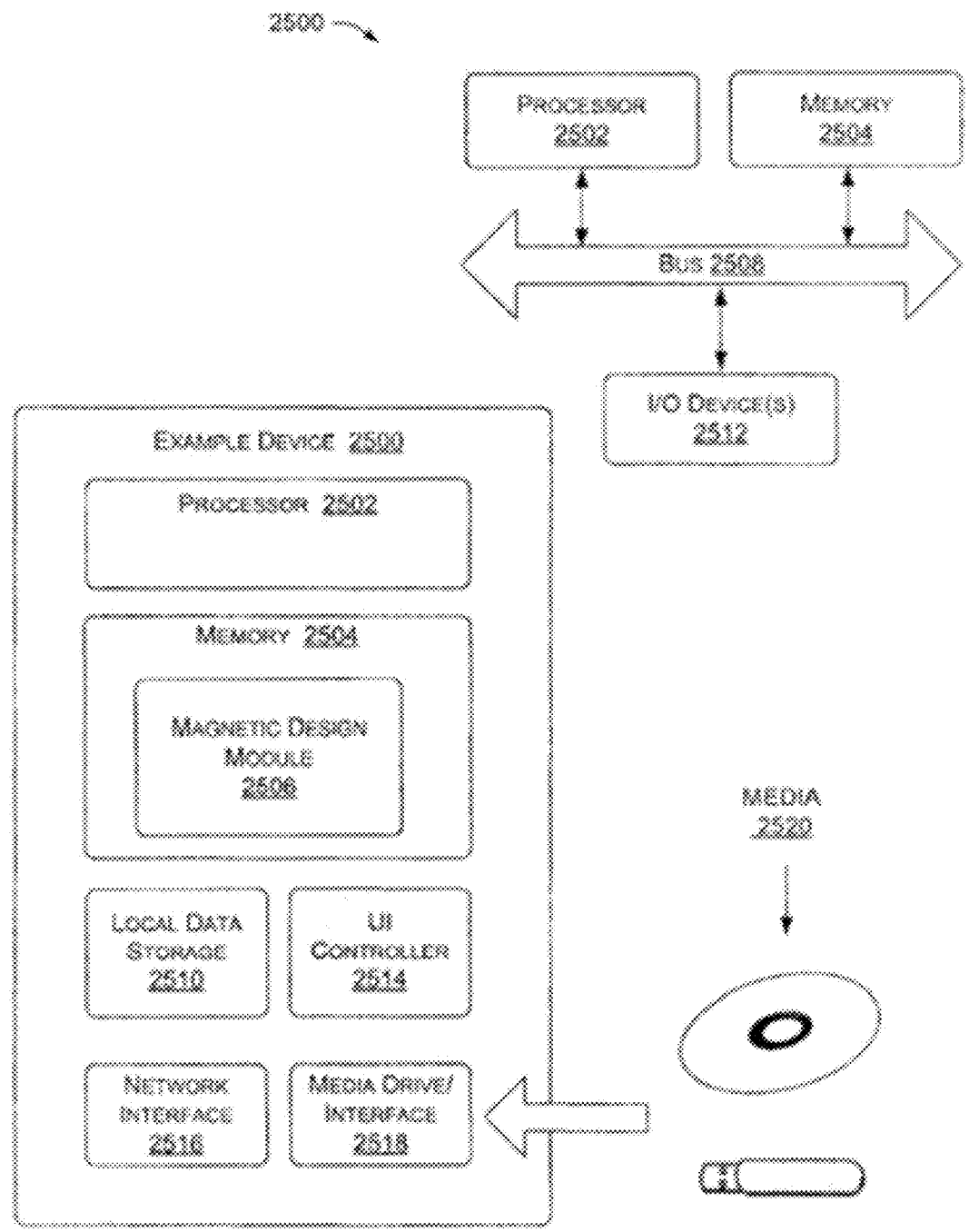
FIG. 7 is a functional block diagram of an exemplary computer processing system.

The revised optimal rate with the new quadratic is $$q_{g1,O} = 524.9 \text{ ML d}^{-1}, \qquad \text{Eqn. (29)}$$

for which the oil production rate as per the data of FIG. 7 would be 266.7 m$^3$ d$^{-1}$. Now. in order to preserve non-monotonicity in the $q_o$ vs. $q_g$ relation, the gas rate data point (722 MLd$^{-1}$) can be dropped and replaced with the new gas rate and corresponding oil rate. The gas rates then are $\{169.9, 524.9, 491.8\}$ ML d$^{-1}$. The revised quadratic is $$q_{o1} = -0.0005286 q_{g1}^2 + 0.4915 q_{g1} + 154.3. \qquad \text{Eqn. (30)}$$

The corresponding setting for optimal gas rate is $$q_{g1,O} = 464.9 \text{ ML d}^{-1}. \qquad \text{Eqn. (31)}$$

The oil rate per FIG. 7 is 269.0 m$^3$d$^{-1}$, which is demonstrably the highest oil rate achieved so far. The new gas rates become $\{169.9, 521.8, 464.9\}$ MLd$^{-1}$. A revised quadratic then is $$q_{o1} = -0.0005522 q_{g1}^2 + 0.5079 q_{g1} + 152.2, \qquad \text{Eqn. (32)}$$

which leads us to $$q_{g1,O} = 459.9 \text{ ML d}^{-1}, \qquad \text{Eqn. (33)}$$

for which the oil production (see FIG. 7 and interpolate) is 269.2 m$^3$d$^{-1}$ nearly the same as the previous step. The gas rates in the sequence are $\{169.9\ 521.8, 459.9\}$MLd$^{-1}$ with the quadratic becoming $$q_{o1} = -0.0005620 q_{g1}^2 + 0.5147 q_{g1} + 151.4, \qquad \text{Eqn. (34)}$$

so that an updated gas rate setting becomes $$q_{g1,O} = 457.9 \text{ ML d}^{-1}, \qquad \text{Eqn. (35)}$$

with the corresponding oil rate being 269.2 m$^3$ d$^{-1}$, same as the previous value within truncation errors. Thus, a satisfactory result is obtained by a totally autonomous operation. The true maximum is about 270.2 m$^3$d$^{-1}$. The reason for the difference between values is that one of the gas rates is spaced far from the maximum.

Given the minor variation in oil production rate, as an alternative to the above iterative sequence, at some point one may choose to stop further optimization, other than a periodic shift in gas injection rate in order to test the migration of the optimal operating point. Alternatively, since we appear to be always on the right side' (higher $q_g$) of the maximum in the updates, the point corresponding to the gas rate of 169.9 ML d$^{-1}$ is not replaced. Thus, we have an anchoring problem that prevents accelerated convergence. So periodically. it is advisable to migrate a distance in $q_g$ (for example, say a maximum of 10% of the previous operating point in a direction towards an anchored point.

As an example. let us choose the next gas rate to be 10% lower than the previous setting (i.e., towards the anchored point). The rate is then 413.9 ML d$^{-1}$ for which the oil rate is 269.6 m$^3$ d$^{-1}$. To preserve non-monotonicity. the anchor point stays put, but with a new quadratic of $$q_{o1} = -0.0006169 q_{g1}^2 + 0.5529 q_{g1} + 146.5, \quad \text{Eqn. (36)}$$

setting the new optimal gas injection rate of $$q_{g1,o} = 448.1 \text{ ML d}^{-1}, \quad \text{Eqn. (37)}$$

for an oil rate of 269.6 m$^3$ d$^{-1}$. Since this suggests that the optimal rate is between 413.9 ML d$^{-1}$ and 448.1 ML d$^{-1}$, the prior value of $q_{g1}$=169.9 ML d$^{-1}$ may now be discarded. Convergence to the true maximum is reached rapidly. The new optimal gas rate with the updated quadratic is 431.1 ML d$^{-1}$. with an oil production rate of 270.1 m$^3$ d$^{-1}$. This is very close to the true maximum of 270.3 m$^3$ d$^{-1}$ and is achieved in just three steps.

Multi-Well Example

Figure 4B:
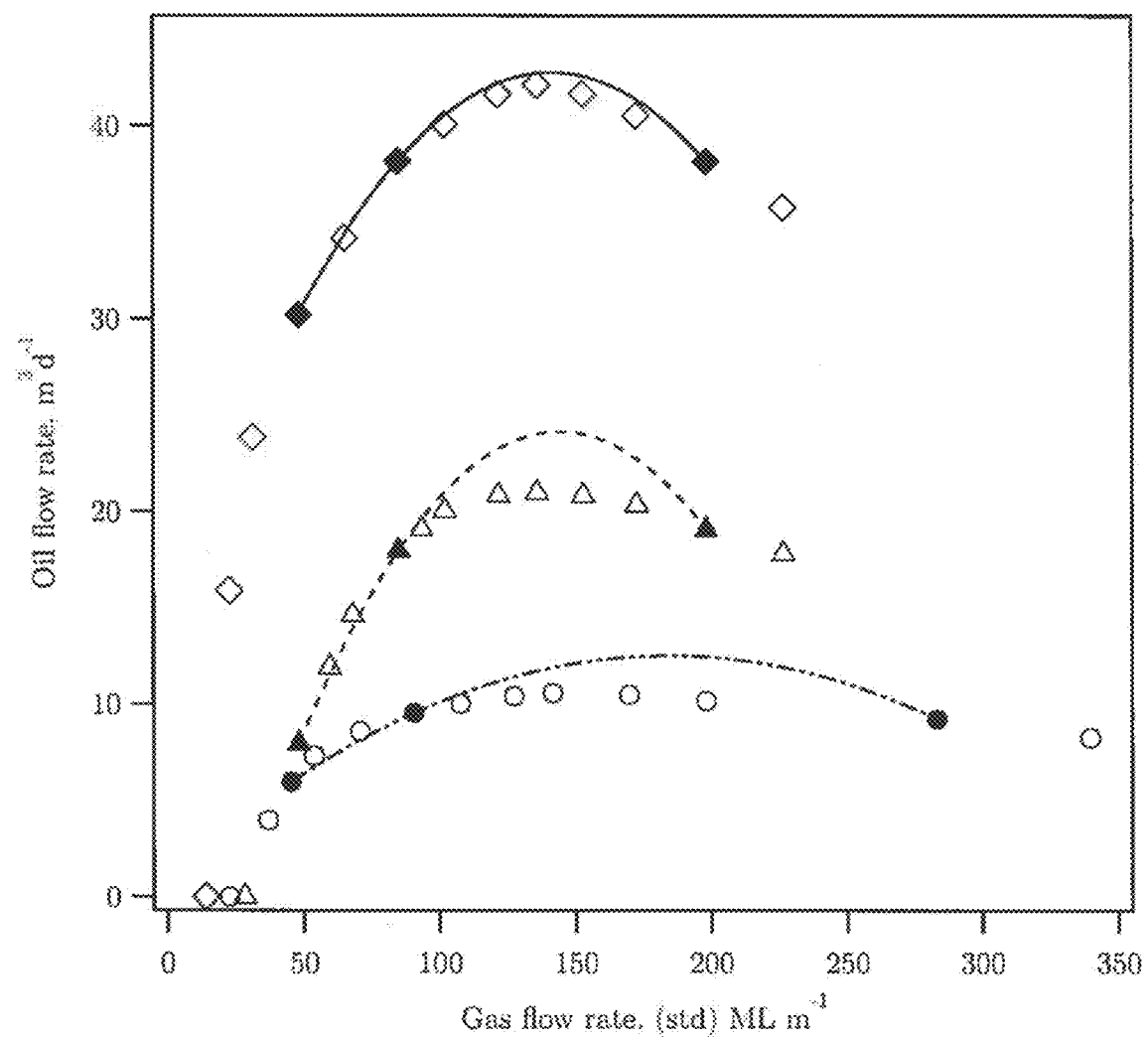
FIG. 4B is a plot of the flow rate of produced oil as a function of gas injection flow rate for three exemplary production wells employing a gas lift system similar to that shown in FIG. 3. The plot shows three curves, all of which are quadratic in form and determined using the control scheme as described in the present disclosure. The plot also shows field data as different markers for the three production wells.

In order to illustrate multi-well applications, consider the case of three wells with each well one producing oil only at a non-zero positive gas injection flow rate. The 'data' points and the first three rates used for the quadratic are shown in FIG. 4B. For the purpose of illustration, the constraints $\theta_{gi}$ are set to 30 ML d$^{-1}$ and $Q_g$ is set to 300 ML d$^{-1}$. This prevents the gas flow rates being set so that maximum oil rate is not possible in all three wells. The minimum rate ensures non-negative oil production in all wells. For the starting quadratic functions, $$q_{g1} = \{48.14, 84.95, 198.2\} \text{ ML d}^{-1}, \quad \text{Eqn. (38)}$$

$$q_{g2} = \{48.14 \; 84.95, 198.2\} \text{ ML d}^{-1}, \quad \text{and Eqn. (39)}$$

$$q_{g3} = \{45.31, 90.61, 283.2\} \text{ ML d}^{-1}, \quad \text{Eqn. (40)}$$

so that $$q_{o1} = -0.0001439 q_{g1}^2 + 0.4075 q_{g1} + 13.93, \quad \text{Eqn. (41)}$$

$$q_{o2} = -0.0001748 q_{g2}^2 + 0.5047 q_{g2} - 12.3, \quad \text{and Eqn. (42)}$$

$$q_{o3} = -0.0003389 q_{g3}^2 + 0.1250 q_{g3} - 0.9936. \quad \text{Eqn. (43)}$$

Here, the combined optimal points exceed $Q_g$. Using the multi-well optimization with the quadratics and the constraint $Q_g$, the optimal rates are calculated as $$q_{g1,o} = 113.5 \text{ ML d}^{-1}, \quad \text{Eqn. (44)}$$

$$q_{g2,o} = 121.3 \text{ ML d}^{-1}, \text{ and} \quad \text{Eqn. (45)}$$

$$q_{g3,o} = 65.2 \text{ ML d}^{-1}. \quad \text{Eqn. (46)}$$

Through linear interpolation between the data points shown in FIG. 8, the total oil production rate $Q_o$ can be calculated as 69.97 m$^3$ d$^{-1}$. Constructing updated quadratics with these new rates in which non-monotonicity is retained, the newly optimized gas rates are given as $$q_{g1,o} = 116.7 \text{ ML d}^{-1}, \quad \text{Eqn. (47)}$$

$$q_{g2,o} = 114.0 \text{ ML d}^{-1}, \text{ and} \quad \text{Eqn. (48)}$$

$$q_{g3,o} = 69.3 \text{ ML d}^{-1}. \quad \text{Eqn. (49)}$$

The total oil production rate $Q_o$ for the newly chosen operating points can be calculated as 70.24 m$^3$ d$^{-1}$. The difference in the total oil production rate $Q_o$ though improved is within the margin of error of interpolation errors, and may be considered to be close to optimal just after the first step.

The operating point may be adjusted further when a meaningful change is detected in lift performance. Such meaningful change can be inferred from a noticeable change in oil production rate (for example, 5% or more). A new quadratic may be constructed with the updated gas flow rate, and this will automatically move the operation to a new optimal point. Thus, a continuous tracking of the optimal operating point is achieved.

Initialization

The automated control scheme employs three data points of the oil production flow rate $q_{oi}$ as related to the gas injection flow rate $q_{gi}$ for each well in order to obtain the initial quadratic functions. Since this is only an initialization process, and is refined with data, it is reasonable to start with $q_{oi}$=0 for $q_{gi}$=0 for each well i. The process can then start with an initial rate $q_g$ and then increase it by a factor f>1. If upon increasing it to f $q_g$, and $q_o$ is not reduced, an enhanced f factor can be applied, dropping the earliest rate (here it is 0), until three rates are available that result in a non-monotonic quadratic function $\hat{q}_o(q_g)$.

Why Quadratic?

The quadratic function is the simplest form of a polynomial that allows for a maximum in the relation of the oil production flow rate $q_o$ to the gas injection flow rate $q_g$. Furthermore, an expression for the position of the maximum relies on the most current data of three points, and thus avoids the problem of the slow drift due to reservoir pressure change expected over time. The separation of well performance from that of the reservoir makes it unnecessary to utilize reservoir-model-based-optimization that is usually fraught with uncertainty.

Direct Constrained Optimization

The previous sections illustrate how, with a $Q_g$ constraint, a forward calculation based on Eqn. (19) provides a system of linear equations for $q_{gi}$. With $\theta_{gi}$ imposed, the problem can be reduced to sequential reduction of constraints as done through Eqn. (19). An alternative approach is based on shifted gas flow rates by recognizing the following $$\sum_{i=1}^{N} \theta_{gi} < Q_g, \text{ and} \quad \text{Eqn. (50)}$$

$$\hat{q}_{oi}(\theta_{gi}) \geq 0. \quad \text{Eqn. (51)}$$

A shifted gas flow rate can be defined as $$s_{gi} = q_{gi} - \theta_{gi}. \quad \text{Eqn. (52)}$$

The quadratic functions $\hat{q}_{oi}$ can be redefined in terms of $s_{gi}$ so that $$\tilde{q}_{oi}(s_{gi}) = \hat{q}_{oi}(q_{gi}). \quad \text{Eqn. (53)}$$

We also note that the true optimal operating point (denoted by an asterisk) should satisfy $$q^*_{gi,o} > \theta_{gi} \text{ or } s^*_{gi,o} > 0. \quad \text{Eqn. (54)}$$

Now, the function $\tilde{q}_{oi}(s_{gi})$ is strictly convex upward. With ' indicating differentiation "with respect to" argument, $\tilde{q}'_{oi}(s_{gi})<0$. Also $\tilde{q}'_{oi}(0)>0$.

At any stage of iteration, three points $s_{gi1}$, $s_{gi2}$ and $s_{gi3}$ can be collected through which is formed a quadratic function. The three points $s_{gi1}$, $s_{gi2}$ and $s_{gi3}$ are chosen so that oil rates with respect to $s_{gi}$ are non-monotonic. This implies that $$\frac{q_{oi}(s_{gi2}) - q_{oi}(s_{gi1})}{s_{gi2} - s_{gi1}} > 0, \text{ and} \qquad \text{Eqn. (55)}$$

$$\frac{q_{oi}(s_{gi3}) - q_{oi}(s_{gi3})}{s_{gi3} - s_{gi2}} < 0. \qquad \text{Eqn. (56)}$$

Let the quadratic passing through the three points $s_{gi1}$, $s_{gi2}$ and $s_{gi3}$ be $$\tilde{q}_{oi} = \tilde{A}_i s_{gi}^2 + \tilde{B}_i s_{gi} + \tilde{C}_i. \qquad \text{Eqn. (57)}$$

We have already shown that $\tilde{A}_i < 0$. Therefore, the quadratic is also convex upward. Given the mean value theorem, and the convexity of $q_{oi}$ with respect to $s_{gi}$, it is necessary that $$\tilde{q}'_{oi}(s_{gi1}) > \frac{q_{oi}(s_{gi2}) - q_{oi}(s_{gi1})}{s_{gi2} - s_{gi1}} > 0, \text{ and} \qquad \text{Eqn. (58)}$$

$$\tilde{q}'_{oi}(s_{gi3}) > \frac{q_{oi}(s_{gi3}) - q_{oi}(s_{gi2})}{s_{gi3} - s_{gi2}} < 0. \qquad \text{Eqn. (59)}$$

Thus, the new operating point both with respect to the quadratic $$\left(-\frac{\tilde{B}_i}{2\tilde{A}_i}\right)$$

and the true optimum determined by $\tilde{q}'_{oi}(s_{gi}) = 0$ is such that $$s_{gi1} < s_{gi,O} < s_{gi3}. \qquad \text{Eqn. (60)}$$

Since every update in iteration ensures non-monotonicity, the newly chosen point is bounded by points 1 and 3. Thus, when $Q_g$ is not constraining the optimal gas rates, the solutions are well-founded and lie between $s_{gi1}$ and $s_{gi3}$ and satisfy the $\theta_{gi}$ bounds.

Let us now construct optimal operating points for multiple wells with a $Q_g$ constraint. Given $Q_g$ and $\theta_{gi}$, noting Eqn. (50), a constraint $\tilde{Q}_g$ can be defined as $$\tilde{Q}_g = Q_g - \sum_{i=1}^{N} \theta_{gi} > 0. \qquad \text{Eqn. (61)}$$

The shifted gas flow rate for the last well N can be defined as $$s_{gN} = \tilde{Q}_g - \sum_{i=1}^{N-1} s_{gi}. \qquad \text{Eqn. (62)}$$

To determine the quadratics, the process starts with all $s_{gi1} > 0$. With the quadratics obtained with $s_{gi}$ as the independent variable, the total production rate (see Eqn. (19)) when maximized gives $$2\tilde{A}_i s_{gi,O} + \tilde{B}_i - 2A_N\left(\tilde{Q}_g - \sum_{j=1}^{N-1} s_{gi,O}\right) - \tilde{B}_N = 0 \text{ for } i = 1, \qquad \text{Eqn. (63)}$$
$$2, \ldots, N-1,$$

in which all $\tilde{A}_i < 0$ and all $\tilde{B}_i > 0$. In order to satisfy $\theta_{gi}$ bound, $s_{gi,O}$ must be $\geq 0$. Shifting of $q_{gi}$ to $s_{gi}$ has the advantage that the process does not need to keep track of independent thresholds. Now the linear system of Eqn. (63) is solved as before. If the solver leads to some (M) of the $s_{gi,O}$ to be less than zero, these are set equal to zero, and the remaining N−M−1 equations are solved. The process is continued until optimal points are reached with all $s_{gi,O} \geq 0$.

FIGS. 5A-5E, collectively, is a flow chart that illustrates a control scheme for gas lift operations for multiple wells based on direct constrained optimization using shifted gas flow rates. The operations can be performed by a controller, such as the controller 162 of FIG. 3.

The operations begin in block 1001 where initial values for variables and constraints N, $Q_g$, $\theta_{gi}$ are provided by user input.

In block 1003, a shifted gas flow rate $s_{gi}$ is defined for each well i with respect to a gas injection flow rate $q_{gi}$ and threshold flow rate $\theta_{gi}$ as: $s_{gi} = q_{gi} - \theta_{gi}$.

In block 1005, a constraint is defined based on the total allowable gas injection flow rate $Q_g$ and threshold gas injection flow rates $\theta_{gi}$ for each well i as:

$$\tilde{Q}_g = Q_g - \sum_{i=1}^{N} \theta_{gi}.$$

In block 1007, an initial quadratic function $\tilde{q}_{oi}(s_{gi})$ is defined for each well i. The quadratic function $\tilde{q}_{oi}(s_{gi})$ specifies the oil production flow rate $q_{oi}$ as a function of $s_{gi}$ for well i.

In block 1009, the control valve and injection line flow meter for well i (with i initially set to 1) is used to set two different $q_{gi}$, which correspond to two different $s_{gi}$. For each one of the two $q_{gi}$ (and corresponding $s_{gi}$), the production line flow meter for the well i is used to measure the produced oil flow rate $q_{oi}$ for non-monotonic $q_{oi}$.

In block 1011, a predefined $s_{gi}$, $q_{oi}$ data point of (0,0) as well as the two $s_{gi}$, $q_{oi}$ data points from block 1009 are used to construct the quadratic function $\tilde{q}_{oi}(s_{gi})$ for the well i.

In block 1013, the quadratic function $\tilde{q}_{oi}(s_{gi})$ for the well i of block 1011 is used to obtain an optimal shifted gas flow rate $s_{qi,O}$ for well i, which assumes that no limits have been applied by constraints. In this block, the optimal shifted gas flow rate $s_{qi,O}$ can be given by the coefficients of the quadratic function $\tilde{q}_{oi}(s_{gi})$ of Eqn.

$$\text{as } s_{qi,O} = \left(-\frac{\tilde{B}_i}{2\tilde{A}_i}\right). \qquad (57)$$

In block 1015, the well index i is incremented.

In block 1017, the operations check that the current well index i does not exceed the maximum number $i_{max}$ (which corresponds to the number of N wells specified by user input in block 1001). If so, the operations revert to block 1007 to repeat the operations of blocks 1007 to 1015 for the next well. If not, the operations continue to block 1019.

In block 1019, the operations check whether the condition $$\sum_{i=1}^{N}(s_{gi,O}) > \tilde{Q}_g$$

is true or false, which checks that the sum of the optimal shifted gas flow rate $s_{gi,O}$ for all wells does exceed $\tilde{Q}_g$ (which is based on the total available gas flow rate $Q_g$ per Eqn. (61)). If true, the operations continue to blocks 1021 to 1027 of FIGS. 5C and 5D. If false, the operations continue to blocks 1033 to 1041 of FIG. 5E.

In block 1021, the operations construct a computational model (based on Eqn. (63)) for all N wells.

In block 1023, the operations solve the computational model of block 1021 to determine the optimal shifted gas flow rate $s_{gi,O}$ for the N wells.

In block 1025, the operations identify a set of M wells where the optimal shifted gas flow rate $s_{gi,O}$ as determined in block 1023 is less than 0, and sets the shifted gas flow rate $s_{gi}$ for these M wells to 0.

In block 1027, the operations check whether M is greater than 0 (i.e., the set of M wells is empty). If not (i.e., the set of M wells is not empty), the operations continue to block 1029 in order to reconstruct the computational model (Eqn. (63)) for N−M−1 wells with shifted gas flow rates $s_{gi}$ specified according to block 1025 and the operations revert back to repeat the operations of blocks 1023 to 1027 for the updated model. If so (i.e., the set of M wells is empty), the operations continue to block 1031.

Figure 5A:
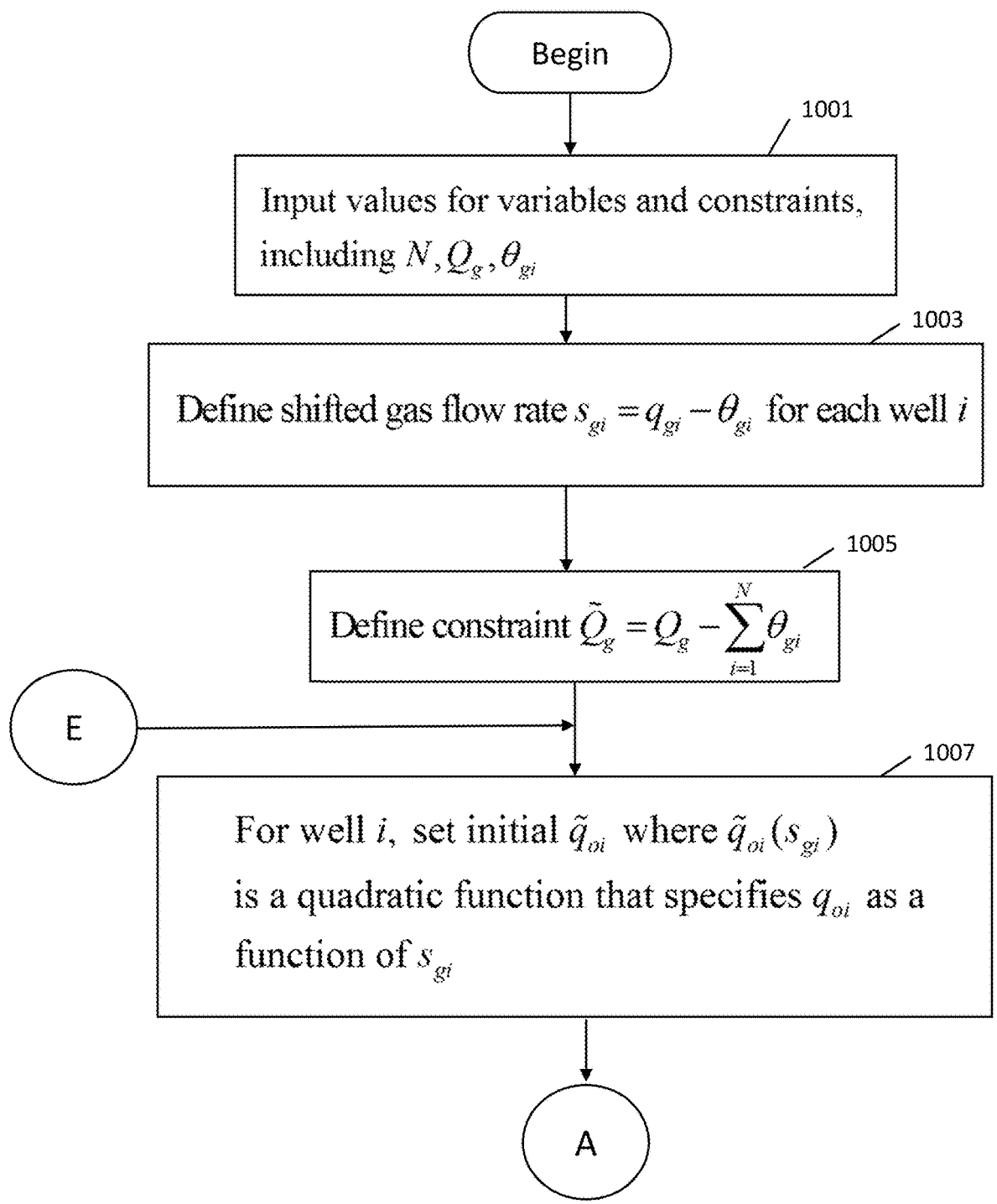
FIGS. 5A-5E, collectively, is a flow chart that illustrates a control scheme for gas lift operations for multiple wells based on direct constrained optimization using shifted gas flow rates.
Figure 5B:
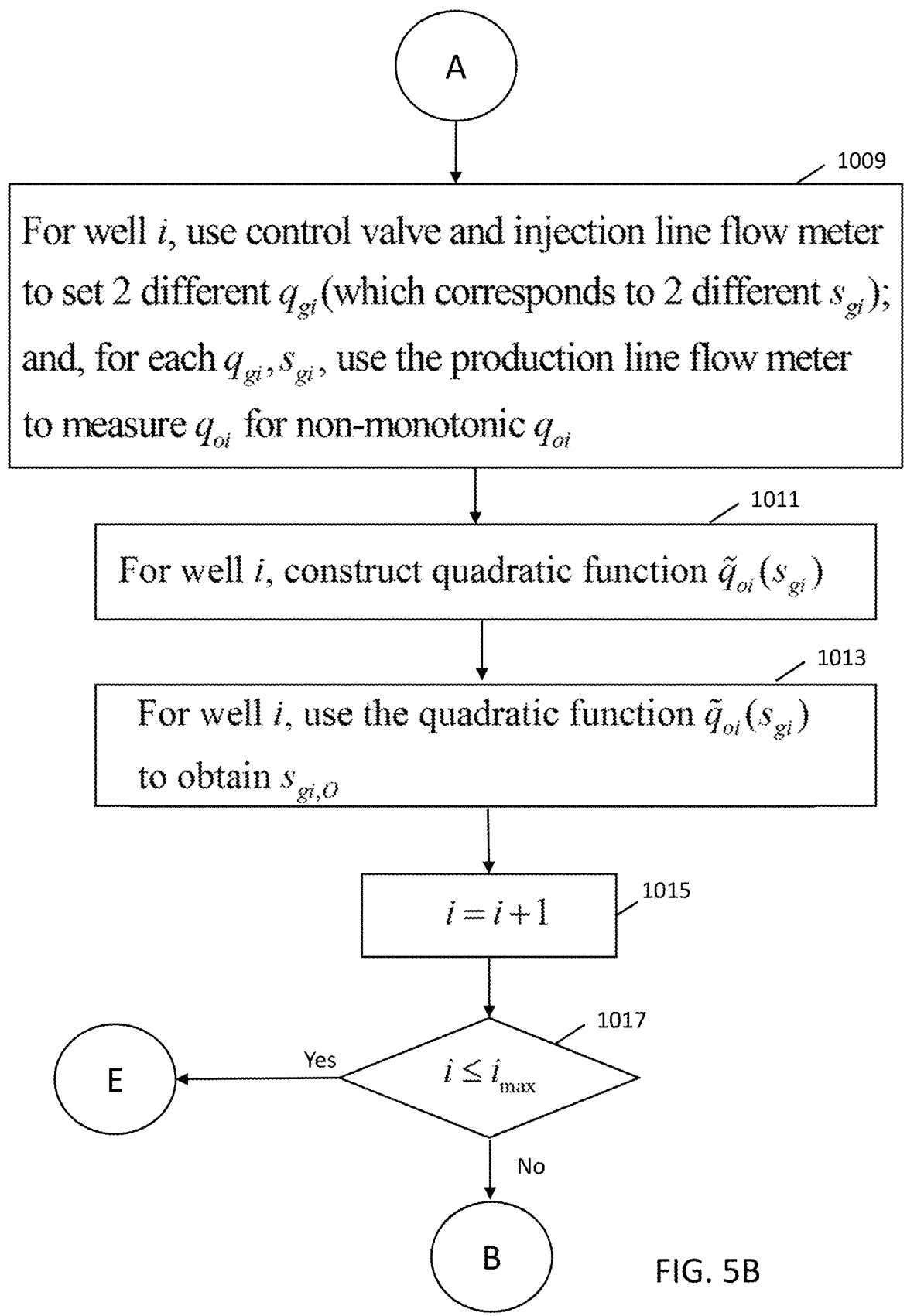
Figure 5C:
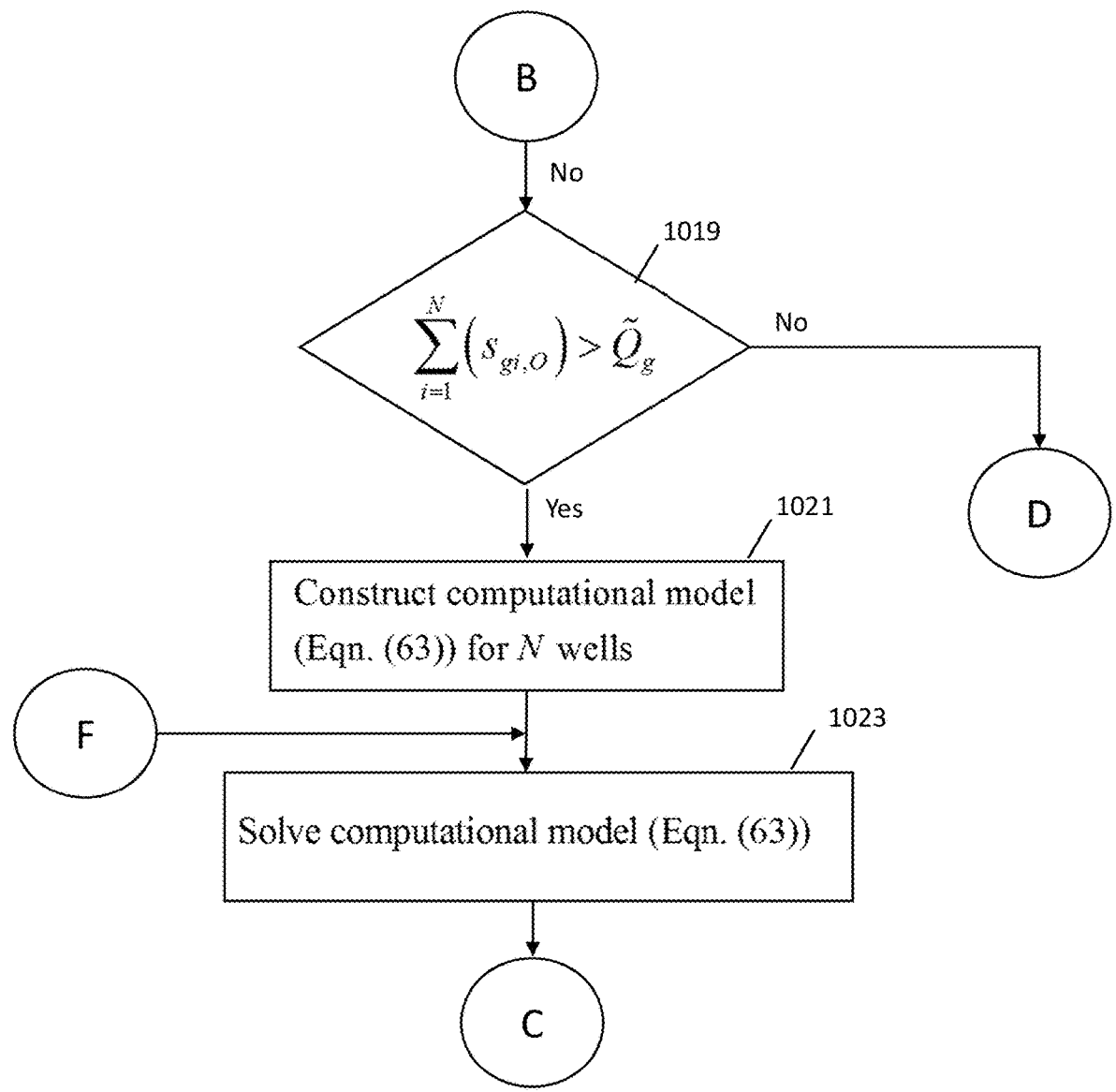
Figure 5D:
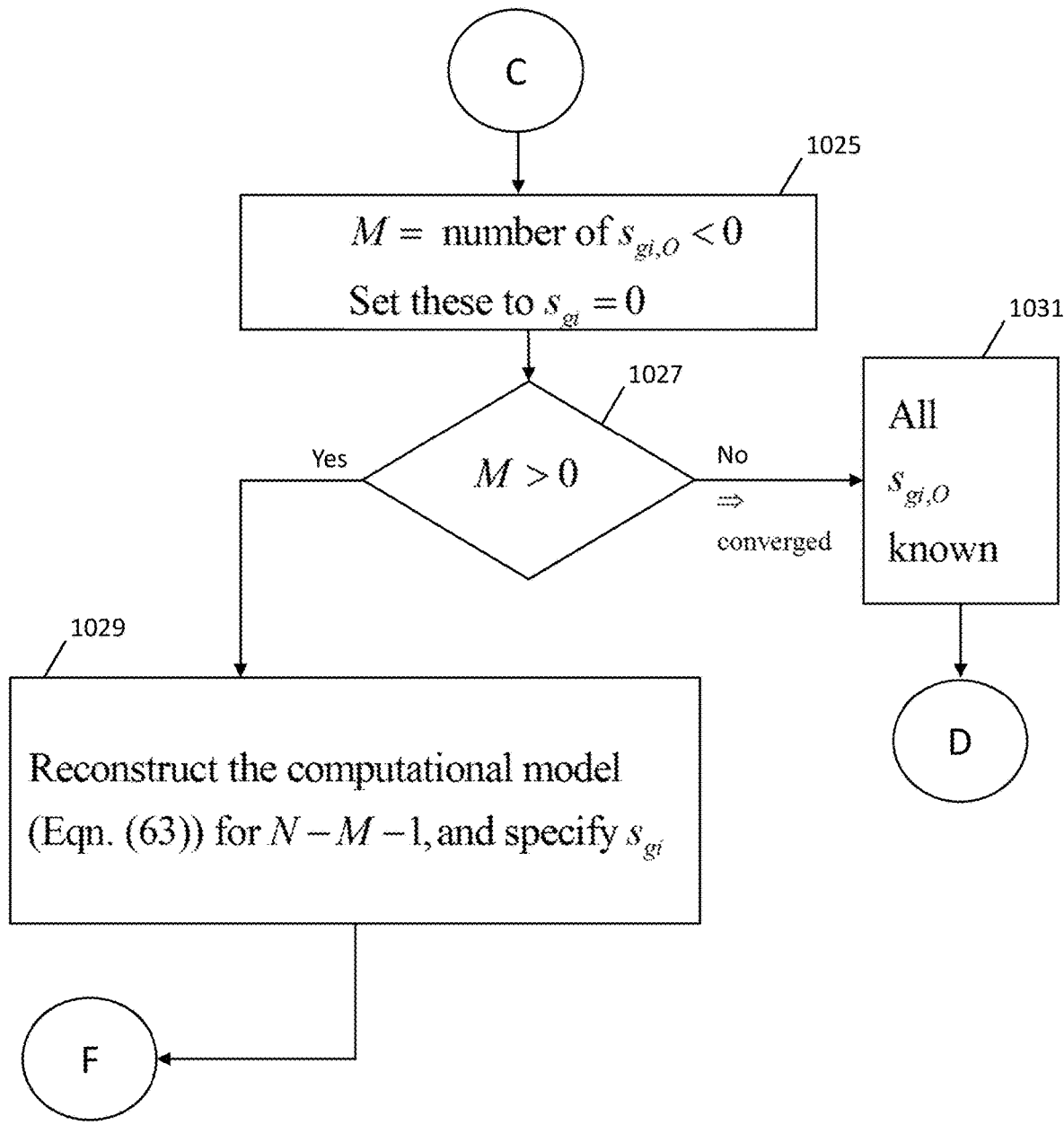
Figure 5E:
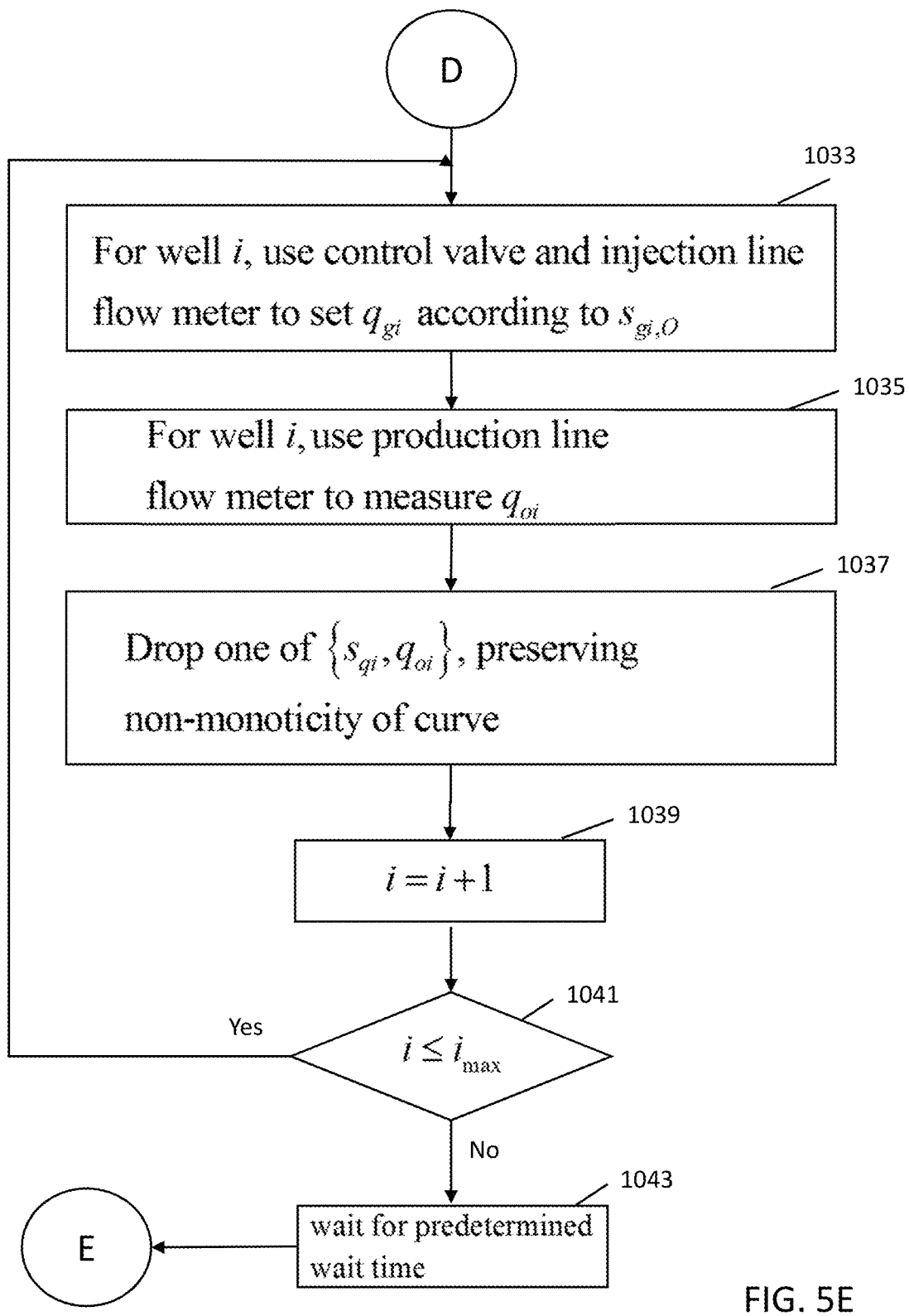

In block 1031, the process has converged and the optimal shifted gas flow rate $s_{gi,O}$ for all of the N wells is known, and the operations continue to blocks 1033 to 1041 of FIG. 5E.

In block 1033, the control valve and the injection line flow meter for well i (with i initially set to 1) is used to set $q_{gi}$ according to the known $s_{gi,O}$ (Eqn. (52)).

In block 1035, the production line flow meter for well i is used to measure $q_{oi}$ for well i.

In block 1037, one of the three data points $s_{gi}, q_{oi}$ that was last used to build the quadratic function $\tilde{q}_{oi}(s_{gi})$ for the well i is dropped and replaced by the data point for $s_{gi,O}$ and $q_{oi}$ (as measured in block 1035) for the well i.

In block 1039, the well index i is incremented.

In block 1041, the operations check that the current well index i does not exceed the maximum number $i_{max}$ (which corresponds to the number of N wells specified by user input in block 1001). If so, the operations revert to block 1033 to repeat the operations of blocks 1033 to 1041 for the next well. If not, the operations continue to block 1043 to wait for a predetermined wait time and then return to block 1007 to repeat the control process. Note that the wait time of block 1043 is anticipated to depend on the surveillance rate suitable for continuous operation.

Nonlinear Optimization

In the foregoing, an efficient procedure to establish the relationship of oil production with gas injection in a physical well was demonstrated. In addition, as the multiple wells in the gathering system are treated in a separable manner, the outcome is that a definitive quadratic model can be realized for each concurrently over a number of sampling steps. However, at this juncture, instead of using the multi-well scheme described above, one may resort to a broader and more robust solution procedure enabled by application of nonlinear optimization using a sequential quadratic programming (SQP) solver. Notably, under the stipulated assumptions, the models are smooth, convex and differentiable, and hence. the problem is simple to solve.

With regard to the above mentioned, consider a problem of N wells, each with a definitive realized production curve as per Eqn. (14) or Eqn. (57). For a given maximum available injection gas flow rate $Q_g$, the general nonlinear constrained optimization problem can be stated as $$\max(\Sigma_{i=1}^{N}q_{oi}(q_{gi})):q_{gi}^{L} \leq q_{gi} \leq q_{gi}^{U}, \quad \text{Eqn. (64)}$$

subject to $$\sum_{i=1}^{N} q_{gi} \leq Q_g, \quad \text{Eqn. (65)}$$

where $q_{gi}^{L}$ and $q_{gi}^{U}$ indicate the lower and upper bounds for gas injection in the i-th well, respectively. Notably, $q_{gi}^{L}$ may be zero, or set to $\theta_{gi}$ if a minimum injection is stipulated. $q_{gi}^{U}$ may be limited to the anticipated unconstrained optimum of the quadratic form as per Eqn. (8) since it will never be desirable to over inject. Indeed. if $\Sigma_{i=1}^{N}q_{gi,O}$ is less than the available gas $Q_g$, then the optimal solution is known directly from $$s_{gi,O} = -\frac{\tilde{B}_i}{2\tilde{A}_i}.$$

The advantage of solving the constrained nonlinear optimization problem (in place of the iterative procedure described above) is that it implicitly provides the best possible solution subject to all stipulated constraints in one go (i.e., it will return the highest objective measure given gas injection bounds and specified resource limitations). Moreover, any objective function can be considered, and any number and type of additional constraints can be imposed. For example, well limits by fluid phase, or collectively as cumulative quantities may be specified. Hence, this procedure can impart greater flexibility, robustness and guarantees solution optimality for the problem posed. Finally, once established, the solution can be evaluated in practice, and the resulting sample points used to update the proxy quadratic models of each well in the field. The procedure can thus be repeated, as outlined in the main section. The procedure however can employ a computing environment (e.g., computer processing system) that is configured to process the SQP algorithm.

Figure 6:
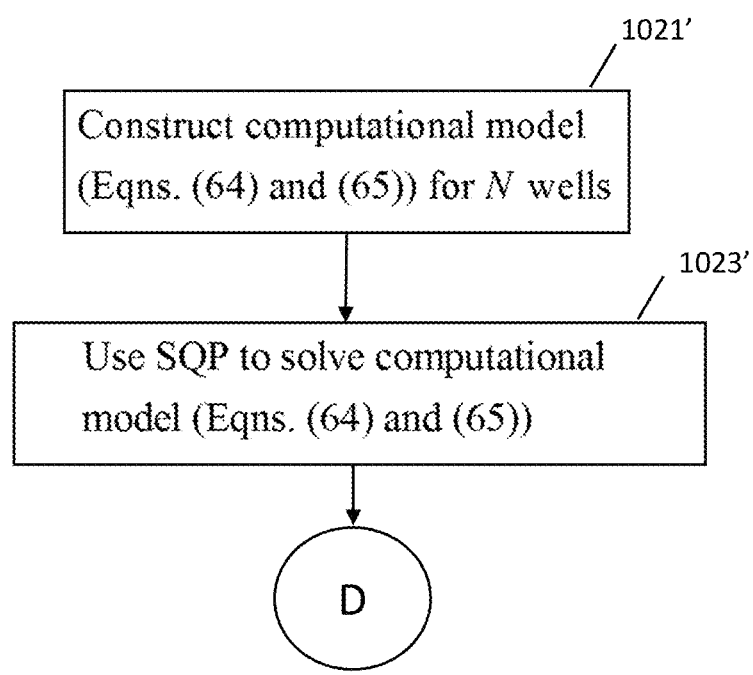
FIG. 6 is a flow chart that illustrates adaptations to the gas lift control scheme of FIGS. 5A-5E based on nonlinear optimization of gas flow rates.

FIG. 6 illustrates adaptations to the control scheme of FIGS. 5A to 5E based on nonlinear optimization of the gas flow rates for multiple wells. The operations can be performed by a controller, such as the controller 162 of FIG. 3. In this control scheme, the iterative operations of blocks 1021 to 1029 of FIGS. 5C and 5D are replaced by the operations 1021' and 1023' of FIG. 6.

In block 1021', the operations construct a non-linear computation model (based on Eqns. (64) and (65)) for all N wells.

In block 1023', the operations use the SQP solver to solve the non-linear computation model of block 1023' to determine the optimal gas flow rate $q_{gi,O}$ for the N wells, and the operations continue to block 1033 of FIG. 5E to update the gas injection rates for the for the N wells based on the optimal gas flow rate $q_{gi,O}$ for the N wells, update the quadratic function used for the optimization, and wait for predetermined wait time before repeating the control process. Note that the use of shifted gas rates is unnecessary for the SQP solver and thus the SQP solver can be configured to determine the optimal gas flow rate $q_{gi,O}$ (non-shifted) for the N wells and the subsequent operations can use the optimal gas flow rate $q_{gi,O}$ for the N wells to update the gas injection rates for the for the N wells.

Creep

A slow change in gas-lift performance is akin to creep, and is reflected by the liquid production rate. By having a continuous update of the quadratic with changing oil production rate ensures a change in optimal gas injection rate, which in turn provides a data point at the 'new' optimal. If the new rate allows us to update the quadratic by preserving non-monotonicity, a continuous optimal operation of a creeping reservoir is possible.

Value Optimization

The gas lift control scheme that is described herein is configured to optimize the flow rate of produced oil from one or more wells. Potentially more impactful, is the ability to carry out economic optimization. Rather than optimizing $q_o$ with respect to $q_g$, one may consider optimizing $q_o - \alpha q_g - \beta q_w$, or maximizing $\Sigma(q_{oi} - \alpha q_{gi} - \beta q_{wi})$ (if $Q_g$ limits gas), where $\alpha$ is a measure of the ratio of the well-head gas to liquid hydrocarbon value and has units of $m^3 \, ML^{-1}$ and dimensionless $\beta$ is the well-head water liability to liquid hydrocarbon value. Note that gas volume is at standard conditions, and that may show small variations from well to well because of access and location cost differences.

One advantage of value optimization is the direct inclusion of economics in automation, without the need for elaborate simulation-based net present value calculation. The disadvantage is that the time value of money is not considered, but this is balanced by not having to know detailed reservoir characteristics. The latter has large uncertainties.

The second advantage of value optimization is that a nearly flat $q_o$ vs. $q_g$ curve, close to optimal operating condition, 'is sharpened', enabling a more robust approach to the optimum. It also shifts the optimal $q_g$ to the left, and therefore is of value when $Q_g$ limits total available gas.

SUMMARY

The present disclosure describes a fully automated control system for optimizing gas lift in one or more wells, which can include one or more of the following operations:

Operate each well at a set of three gas injection flow rates preferably ones for which the behavior of produced oil flow rate vs. injected gas flow rate for the given well is non-monotonic. Optionally, one of the three rates can be assumed as a produced oil flow rate of zero at an injected gas flow rate of zero.

For a single well, the optimal gas injection flow rate is set based on Eqn. (8), unless bounds are violated. In order to avoid violating bounds it is preferable to employ data points of produced oil flow rate vs. shifted gas flow rate ($s_g$) rather than injected gas flow rate ($q_g$).

Use the new setting to update the quadratic function, preferably retaining the non-monotonicity of $q_o$ vs. $q_g$ or $s_g$.

If an anchor point well away from the set $q_g$ (or $s_g$) is detected, then adjust the set $q_g$ (or $s_g$) towards the anchor point by about 10% or less.

Upon converging to an optimal operation, periodically adjust the flow rate, refining the quadratic function (which can involve re-evaluating Eqn. (8)).

For multi-well control and optimization, when $Q_g$ is not a constraint, optimize each well based on $s_g$ with $$s_{gi,O} = \left(-\frac{\tilde{B}_i}{2\tilde{A}_i}\right).$$

For multi-well control optimization, when constraints are imposed, first solve unconstrained optimal settings, i.e., $$s_{gi,O} = \left(-\frac{\tilde{B}_i}{2\tilde{A}_i}\right).$$

If $$\sum_{i=1}^{N}(s_{gi,O}) \leq \tilde{Q}_g,$$

then accept.

If $$\sum_{i=1}^{N}(s_{gi,O}) > \tilde{Q}_g,$$

impose $\tilde{Q}_g$ constraint and re-evaluate the optimal settings $s_{gi,O}$ as per Eqn. (63).

If some (M) $s_{gi,O} < 0$, then set them equal to zero, and re-evaluate the optimal settings $s_{gi,O}$ for N–M–1 equations.

Continue with new estimates of $A_i$, $B_i$ and $C_i$ as in the single well case; update the optimal settings until $q_{gi}$ or $s_{gi}$ converge. Alternatively, use SQP with the updated quadratics.

Reinitiate the entire process after periodically setting $q_{gi}$ to new values and reevaluating $A_i$, $B_i$ and $C_i$, while satisfying the $Q_g$ constraint, and keeping new settings above $\theta_g$ constraints.

FIG. 7 illustrates an example device 2500, with a processor 2502 and memory 2504 that can be configured to implement various embodiments of the optimized gas lift control processes as discussed in this disclosure. For example, device 2500 can be configured to embody the controller 162 of FIGS. 2 and 3. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518. Various processes of the present disclosure or parts thereof can be implemented by instructions and/or software programs that are elements of module 2506. Such instructions and/or software programs may reside on removable media 2520 readable by media drive/interface 2518 as is well known in the computing arts.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of the present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

There have been described and illustrated herein several embodiments of processes and systems for controlling gas lift operations. While particular embodiments have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A method for controlling gas lift in at least one production well, comprising:
  i) receiving, from a first flow meter, a measured first flow rate of gas injected into a production well;
  ii) receiving, from a second flow meter, a measured second flow rate of oil produced from the production well;
  iii) determining, via one or more processors of a controller, a quadratic function that relates the second flow rate of oil produced from the production well to the first flow rate of gas injected into the production well based on the measured first flow rate of gas injected into the production well and the measured second flow rate of oil produced from the production well;
  iv) determining, via the one or more processors of the controller, using the quadratic function, an optimal flow rate of gas injected into the production well;

v) controlling, via a control valve, using the optimal flow rate of gas injected into the production well, an actual flow rate of gas injected into the production well; and vi) receiving, from the second flow meter, a measured third flow rate of oil produced from the production well at the optimal flow rate of gas injected into the production well.

2. A method according to claim 1, further comprising:
repeating the operations of iii) to vi), wherein for one or more iterations of iii) to vi), the quadratic function of iii) is based on the third flow rate of oil in the previous iteration of vi).

3. A method according to claim 2, wherein:
the measured third flow rate of oil in the previous iteration of vi) replaces a data point used to determine the quadratic function in the previous iteration of iii) and preserves non-monotonicity of the quadratic function.

4. A method according to claim 2, wherein:
the operations of iii) to vi) are repeated for one or more iterations until a predetermined criterion is satisfied.

5. A method according to claim 1, wherein:
the quadratic function relates the second flow rate of oil produced from the production well to the first flow rate of gas injected into the production well.

6. A method according to claim 1, wherein:
the quadratic function relates the second flow rate of oil produced from the production well to a shifted gas flow rate of gas injected into the production well, wherein the shifted gas flow rate is based on the first flow rate of gas injected into the production well being less a threshold gas flow rate.

7. A method according to claim 1, wherein:
the optimal flow rate of gas injected into the production well as determined in iv) is based on one or more coefficients of the quadratic function.

8. A method according to claim 1, wherein:
the operations of iii) are performed separately for a plurality of production wells to determine a corresponding plurality of quadratic functions, wherein each quadratic function relates a respective second flow rate of oil produced from one of the plurality of production wells to a respective first flow rate of gas injected into that one production well;
the operations of iv) use the plurality of quadratic functions to determine optimal flow rates of gas injected into each one of the plurality of production wells; and
the operations of vi) use the plurality of optimal flow rates of gas injected into each one of the plurality of the production wells to control the flow rate of gas injected into the plurality of production wells, and measure third oil flow rates produced from the plurality of production wells at the optimal flow rates of gas injected into the plurality of production wells.

9. A method according to claim 8, wherein:
the optimal flow rate of gas injected into at least one corresponding production well of the plurality of production wells as determined in iv) is based on coefficients of the quadratic function for the corresponding production well.

10. A method according to claim 8, wherein:
the optimal flow rate of gas injected into at least one of the plurality of production wells as determined in iv) is based on a constraint.

11. A method according to claim 10, wherein:
the constraint is based on a total available flow rate of injected gas from a common gas source shared by the plurality of production wells.

12. A method according to claim 10, wherein:
the constraint is based on a threshold rate of injected gas for at least one production well.

13. A method according to claim 10, wherein:
the optimal flow rates of gas injected into the plurality of production wells as determined in iv) is based on a system of nonlinear equations solved by a sequential quadratic programming (SQP) solver.

14. A method according to claim 1, wherein:
the quadratic function of iii) relates the second flow rate of oil produced from the production well to the first flow rate of gas injected into the production well at standard conditions.

15. A system for controlling gas lift in at least one production well, comprising:
a first flow meter for measuring flow rate of gas injected into a production well;
a control valve for controlling flow rate of gas injected into the production well;
a second flow meter for measuring flow rate of oil produced from the production well; and
a controller, operably coupled to the first flow meter, the control valve, and the second flow meter, wherein the controller is configured to:
i) determine a quadratic function that relates oil flow rate produced from a production well to gas flow rate of gas injected into the production well based on flow rate measurements of gas injected into the production well performed by the first flow meter and corresponding flow rate measurements of oil produced from the production well performed by the second flow meter;
ii) use the quadratic function to determine an optimal flow rate of gas injected into the production well; and
iii) use the optimal flow rate of gas injected into the production well to control the control valve to control the flow rate of gas injected into the production well, and obtain a measurement of oil flow rate produced from the production well at the optimal flow rate of gas injected into the production well performed by the second flow meter.

16. A system according to claim 15, wherein:
the controller is further configured to repeat the operations of i) to iii), wherein for one or more iterations of i) to iii), the quadratic function of i) is based on the measurement of oil flow rate performed by the second flow meter in the previous iteration of iii).

17. A system according to claim 16, wherein:
the controller is further configured such that the measurement of oil flow rate in the previous iteration of iii) replaces a data point used to determine the quadratic function in the previous iteration of i) and preserves non-monotonicity of the quadratic function.

18. A system according to claim 16, wherein:
the controller is further configured to repeat the operations of i) to iii) for one or more iterations until a predetermined criterion is satisfied.

19. A system according to claim 15, wherein:
the quadratic function relates oil flow rate produced from the production well to injected gas flow rate of gas injected into the production well.

20. A system according to claim 15, wherein:
the quadratic function relates oil flow rate produced from the production well to shifted gas flow rate of gas injected into the production well, wherein the shifted gas flow rate is based on injected gas flow rate less a threshold gas flow rate.

21. A system according to claim 15, wherein:
the controller is further configured such that the optimal flow rate of gas injected into the production well as determined in ii) is based on coefficients of the quadratic function.

22. A system according to claim 15, wherein:
the first flow meter, the control valve, and the second flow meter are provided separately for a plurality of production wells;
the controller is operably coupled to the first flow meter, the control valve, and the second flow meter for the plurality of production wells; and
the controller is further configured such that:
- the operations of i) are performed separately for the plurality of production wells to determine a corresponding plurality of quadratic functions, wherein each quadratic function relates oil flow rate produced from one of the plurality of production wells to gas flow rate of gas injected into that one production well,
- the operations of ii) use the plurality of quadratic functions to determine optimal flow rates of gas injected into each one of the plurality of production wells, and
- the operations of iii) use the plurality of optimal flow rates of gas injected into plurality of the production wells to control the control valve to control flow rate of gas injected into the plurality of production wells, and measure oil flow rates produced from the plurality of production wells at the optimal flow rates of gas injected into the plurality of production wells.

23. A system according to claim 22, wherein:
the optimal flow rate of gas injected into at least one of the plurality of production wells as determined in ii) is based on coefficients of the quadratic function for the corresponding production well.

24. A system according to claim 22, wherein:
the optimal flow rate of gas injected into at least one of the plurality of production wells as determined in ii) is based on a constraint.

25. A system according to claim 24, wherein:
the constraint is based on a total available flow rate of injected gas from a common gas source shared by the plurality of production wells.

26. A system according to claim 24, wherein:
the constraint is based on a threshold rate of injected gas for at least one production well.

27. A system according to claim 24, wherein:
the optimal flow rates of gas injected into the plurality of production wells as determined in ii) is based on a system of nonlinear equations solved by a sequential quadratic programming (SQP) solver.

28. A system according to claim 15, wherein:
the controller comprises a processor.

* * * * *